United States Patent
Chennupati et al.

(10) Patent No.: US 11,238,415 B2
(45) Date of Patent: Feb. 1, 2022

(54) SYSTEMS AND METHODS FOR INTELLIGENT ADHERENCE OR CONFORMANCE ANALYSIS COACHING

(71) Applicant: NICE LTD., Ra'anana (IL)

(72) Inventors: Kalyani Jyotii Chennupati, Coppell, TX (US); Tawana Labelle Manning, New York, NY (US); Ammata Soutdarany, Dallas, TX (US)

(73) Assignee: NICE LTD., Ra'anana (IL)

( * ) Notice: Subject to any disclaimer, the term of this patent is extended or adjusted under 35 U.S.C. 154(b) by 323 days.

(21) Appl. No.: 16/598,544

(22) Filed: Oct. 10, 2019

(65) Prior Publication Data
US 2021/0110354 A1    Apr. 15, 2021

(51) Int. Cl.
| | |
|---|---|
| G06F 3/048 | (2013.01) |
| G06Q 10/10 | (2012.01) |
| G09B 19/00 | (2006.01) |
| G06F 9/54 | (2006.01) |
| G06F 3/0482 | (2013.01) |

(52) U.S. Cl.
CPC ....... *G06Q 10/1095* (2013.01); *G06F 3/0482* (2013.01); *G06F 9/542* (2013.01); *G09B 19/00* (2013.01)

(58) Field of Classification Search
CPC .......... G06F 3/00; G06F 3/048; G06F 3/042; G06F 9/54; G09B 19/00; G06Q 10/10
See application file for complete search history.

(56) References Cited

U.S. PATENT DOCUMENTS

| | | | |
|---|---|---|---|
| 10,171,663 B1 * | 1/2019 | Ouimette | H04M 3/5175 |
| 2003/0086555 A1 * | 5/2003 | McIlwaine | H04M 3/51 379/265.02 |
| 2015/0371172 A1 * | 12/2015 | Minter | G06Q 10/06398 705/7.42 |
| 2020/0202282 A1 * | 6/2020 | Chennupati | G06Q 10/063116 |

* cited by examiner

*Primary Examiner* — Xiomara L Bautista
(74) *Attorney, Agent, or Firm* — Pearl Cohen Zedek Latzer Baratz LLP

(57) ABSTRACT

A system and method for intelligent adherence analysis/conformance analysis coaching where a graphical user interface, which allows a supervisor to select a date range and an objective, such as a goal amount of adherence/conformance to occur at a goal frequency, is displayed; adherence/conformance data, for one or more agents, is received, agents are determined to require coaching based on a comparison of the adherence/conformance data at the goal frequency to the goal amount of occurrences of the goal amount of adherence/conformance at the goal frequency; coaching sessions are scheduled with each of the agents determined to require coaching; and an alert, which includes information indicating why the agent requires coaching, is transmitted to each of those agents.

20 Claims, 12 Drawing Sheets

FIG. 3

| Date | Agent ID | Agent Name | Scheduled Activities | Scheduled Time | Actual Time | Min. in Adherence | Min. out Adherence | Percent in Adherence | +/- Min. in Conformance | Percent in Conformance | Percent of Total Schedule | Percent of Total Actual | Occurrence |
|---|---|---|---|---|---|---|---|---|---|---|---|---|---|
| 2/3/2019 | 42 | John Doe | Break | 0:30 | 0:51 | 15 | 36 | 50% | 21 | 170.00% | 7% | 9% | |
| 2/3/2019 | 42 | John Doe | Lunch | 0:30 | 1:27 | 17 | 60 | 57% | 57 | 290.00% | 7% | 15% | |
| 2/3/2019 | 42 | John Doe | Open | 6:00 | 7:41 | 338 | 121 | 94% | 101 | 128.06% | 86% | 77% | |
| 2/3/2019 | | | Total | 7:00 | 9:59 | 370 | 217 | 88% | 179 | 142.62% | 100% | 100% | 1 |
| 2/6/2019 | 42 | John Doe | Break | 0:30 | 1:49 | 30 | 0 | 100% | 79 | 363.33% | 7% | 17% | |
| 2/6/2019 | 42 | John Doe | Lunch | 0:30 | 1:41 | 20 | 0 | 67% | 71 | 336.67% | 7% | 16% | |
| 2/6/2019 | 42 | John Doe | Open | 6:00 | 7:01 | 305 | 0 | 85% | 61 | 116.94% | 86% | 67% | |
| 2/6/2019 | | | Total | 7:00 | 10:31 | 355 | 0 | 85% | 211 | 150.24% | 100% | 100% | 1 |
| 2/8/2019 | 42 | John Doe | Break | 0:30 | 0:45 | 25 | 20 | 83% | 15 | 150.00% | 6% | 7% | |
| 2/8/2019 | 42 | John Doe | Lunch | 0:30 | 1:50 | 30 | 26 | 100% | 80 | 366.67% | 6% | 17% | |
| 2/8/2019 | 42 | John Doe | Open | 6:45 | 7:59 | 346 | 248 | 85% | 74 | 118.27% | 87% | 76% | |
| 2/8/2019 | | | Total | 7:45 | 10:34 | 401 | 294 | 86% | 169 | 136.34% | 100% | 100% | 1 |
| | | | | | | | | | | | | | 3 |

FIG. 5

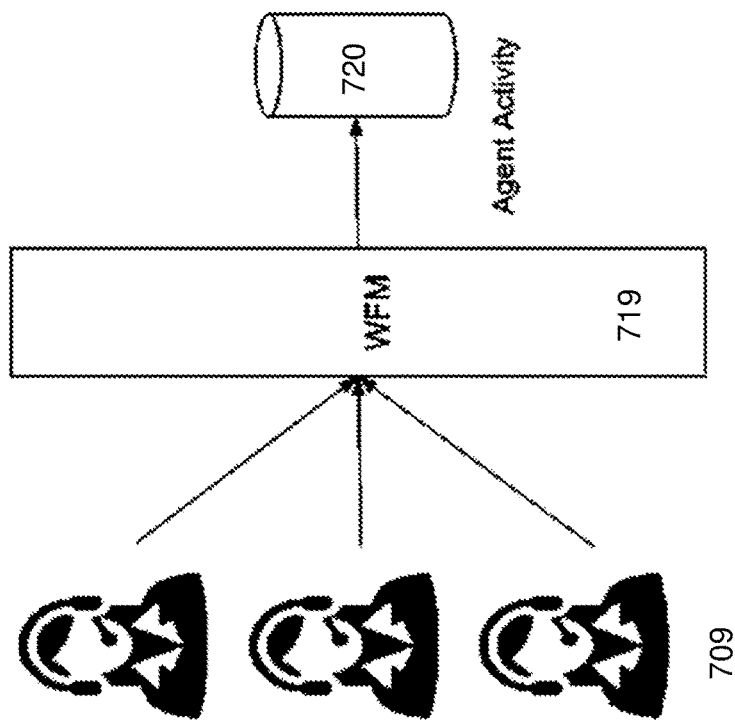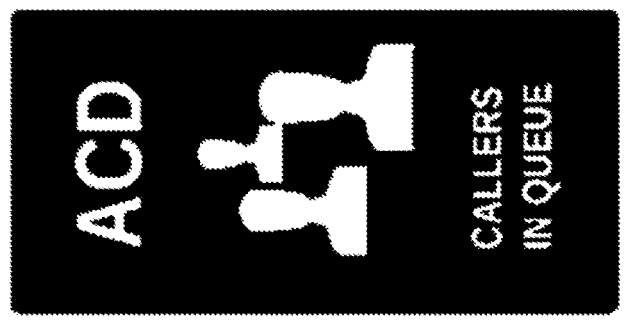
FIG. 7B

SYSTEMS AND METHODS FOR INTELLIGENT ADHERENCE OR CONFORMANCE ANALYSIS COACHING

FIELD OF THE INVENTION

Embodiments of the invention relate generally to technology for automatically identifying agents, utilizing a workforce management system, which have exceeded, met or have not met their objectives. In particular, embodiments of the invention relate to automatically identifying agents in need of coaching based on adherence or conformance data, and providing the identified agents with information that can be utilized by the agent to rectify the issue causing the need for coaching.

BACKGROUND OF THE INVENTION

Company call centers or Internet-based support forums put customers in contact with company employees or agents (e.g., people working for the company providing customer service or other information to customers) for assistance. Agents' performance may be improved by identifying agents which consistently have issues with or failures in meeting their objectives and providing coaching or additional training to those agents. Some issues may be that an agent does not adhere to the scheduled start and stop times of scheduled actives (e.g., the actual start and stop times that the agent performs the scheduled activity does not match the scheduled start and stop times for the scheduled activity) or the agent does not conform to the scheduled total amount of times of scheduled activities (e.g., the actual total amount of time the agent performed the scheduled activity does not match the scheduled total amount of time for the scheduled activity).

Typically, a report may be generated to review the adherence and/or conformance of the agents to determine if any of the agents are not reaching a prescribed goal and, thus, need coaching. However, there is no easy way to identify agents whose adherence and/or conformance is below a prescribed goal, such as a goal amount of adherence and/or conformance. Typically, such a process is manual and time consuming.

For example, managers and/or supervisors (e.g. people at an organization) may need to review, for each day, each agents' performance (e.g., review the agent's adherence data, such as the scheduled start and stop times for each scheduled activity and the actual start and stop times the agent performed each scheduled activity and/or review the agent's conformance data, such as the scheduled total amount of time for performing each scheduled activity and the actual total amount of time the agent actually performed each scheduled activity) to identify agents that may consistently have issues with meeting the prescribed goal, and to identify agents that improved. Due to the amount of data that needs to be reviewed, such a manual process is prohibitively time consuming and tedious.

Additionally, typically, agents who are identified or flagged as not meeting their prescribed goal do not know that there is any issue with their adherence to the scheduled start and stop times or conformance to the total scheduled time for certain scheduled actives until coaching is set up. Further, typically, agents do not know which scheduled activity or activities for which the agent is consistently not meeting his or her goal until they actually receive the coaching. Thus, typically, agents are not empowered with the knowledge necessary to start rectifying their adherence and/or conformance to meet their goal before receiving coaching.

Accordingly, there is a need for a system that can automatically or semi-automatically review agents' adherence data and/or conformance data to identify agents in need of coaching, and to provide information, in advance of the coaching, to the identified agents that the agent can utilize to rectify or start rectifying the issue requiring coaching before receiving the coaching.

SUMMARY OF THE INVENTION

An intelligent adherence analysis or conformance analysis coaching system and method may include a monitor or display and one or more processors. The one or more processors may be configured to display a graphical user interface ("GUI") on the monitor which allows a supervisor to select a date range and an objective. The objective may be a goal amount of occurrences of a goal amount of adherence or a goal amount of conformance to occur at a goal frequency.

The one or more processors may be configured to receive, for one or more employees or agents, adherence data or conformance data. The adherence data may include, for each of one or more scheduled activities during the date range, an amount of time in adherence or an amount of time not in adherence based on a comparison of scheduled start and stop times for the scheduled activity and actual start and stop times that the scheduled activity was actually performed by the agent. The conformance data may include for each of one or more scheduled activities during the date range, an amount of time not in conformance based on a comparison of a scheduled total amount of time for the scheduled activity and an actual total amount of time the scheduled activity was actually performed by the agent.

The one or more processors may be configured to determine if any of the one or more agents require coaching based on a comparison of the adherence data at the goal frequency to the goal amount of occurrences of the goal amount of adherence at the goal frequency, or a comparison of the conformance data at the goal frequency to the goal amount of occurrences of the goal amount of conformance at the goal frequency. The one or more processors may be configured to schedule a coaching session with each of the one or more agents that have been determined to require coaching, and transmit an alert to each of the one or more agents that have been determined to require coaching, wherein the alert comprises information indicating why the agent has been determined to require coaching.

The one or more processors may be configured so that the graphical user interface displays, for each of the one or more agents that have been determined to require coaching, for example:
  a. a result of the comparison of the objective and the adherence data or the conformance data,
  b. a link, which when clicked, causes the one or more processors to display the report in the graphical user interface,
  c. a schedule of the agent's coaching session, and
  d. a link, which when clicked, allows the supervisor to reschedule or cancel the agent's coaching session.

The one or more processors may be configured so that the graphical user interface allows the supervisor to select whether the one or more processors is configured to determine if any of the one or more agents requires coaching based on the objective and the adherence data. According to embodiments of the invention, the adherence data may include, for each of one or more dates in the date range, for each of the one or more agents, a percentage of adherence for the agent based on a comparison of a sum of the amount of time the agent was in adherence or a sum of the amount of time the agent was not in adherence for each of the scheduled activities on that date, and a sum of the scheduled total amount of time for each of the scheduled activities on that date. In such embodiments, the one or more processors may be configured to determine if any of the one or more agents requires coaching by, for each of the one or more agents, determining an amount of nonadherence days in the date range that the percentage of adherence is less than or equal to the goal amount of adherence, and determining if the amount of nonadherence days at the goal frequency is greater than or equal to the goal amount of occurrences of the goal amount of adherence at the goal frequency.

In some embodiments of the invention, the one or more processors may be configured so that the graphical user interface allows the supervisor to select whether the one or more processors is configured to determine if any of the one or more agents requires coaching based on the objective and the conformance data. The conformance data may include, for each of one or more dates in the date range, for each of the one or more agents, a percentage of conformance for the agent based on a comparison of a sum of the actual total amount of time each of the scheduled activities were actually performed by the agent and a sum of the scheduled total amount of time for each of the scheduled activities on that date. In such embodiments, the one or more processors may be configured to determine if any of the one or more agents requires coaching by, for each of the one or more agents, determining an amount of nonconformance days in the date range that the percentage of conformance is less than or equal to the goal amount of conformance, and determining if the amount of nonconformance days at the goal frequency is greater than or equal to the goal amount of occurrences of the goal amount of conformance at the goal frequency.

For each of the one or more agents that have been determined to require coaching, the one or more processors may determine at least one proposed date and time for the coaching based on the agent's work schedule and net staffing during the at least one proposed date and time.

The one or more processors may be configured to, for each of the one or more agents that have been scheduled for a coaching session, cancel the coaching session if an amount of nonadherence days during a predetermined subsequent period of time is less than a first predetermined threshold. In embodiments of the invention, where conformance data is utilized to identify an agent, the one or more processors may be configured to, for each of the one or more agents that have been scheduled for a coaching session, cancel the coaching session if an amount of nonconformance days during the predetermined subsequent period of time is less than a first predetermined threshold. The predetermined subsequent period of time may be between after the date range ends and a time that the agent was scheduled for the coaching session.

According to embodiments of the invention, the one or more processor may be configured to, for each of the one or more agents that have been scheduled for a coaching session, cancel the coaching session if a difference between the amount of nonadherence days during the predetermined subsequent period of time at the goal frequency and the amount of nonadherence days during the date range at the goal frequency is less than a second predetermined threshold. In embodiments of the invention where conformance data is utilized to identify an agent, the one or more processor may be configured to, for each of the one or more agents that have been scheduled for a coaching session, cancel the coaching session if a difference between the amount of nonconformance days during the predetermined subsequent period of time at the goal frequency and the amount of nonconformance days during the date range at the goal frequency is less than a second predetermined threshold.

According to embodiments of the invention, the one or more processors may be configured to generate a report for each of the one or more agents that have been determined to require coaching. If adherence data is utilized to identify an agent, the report may include the adherence data for the agent that has been determined to require coaching and an indication of what days were nonadherence days, or, if conformance data is utilized to identify an agent, the conformance data for the agent that has been determined to require coaching and an indication of what days were nonconformance days.

The one or more processors may be configured to allow the supervisor to select, through the graphical user interface, for each of the one or more agents that have been determined to require coaching, whether the one or more processors transmit the report along with the alert to that agent.

BRIEF DESCRIPTION OF THE DRAWINGS

Dimensions of features shown in the figures are chosen for convenience and clarity of presentation and are not necessarily shown to scale. The invention, both as to organization and method of operation, together with objects, features and advantages thereof, can be understood by reference to the following detailed description when read with the accompanied non-limiting drawings. Embodiments of the invention are illustrated by way of example and not limitation in the figures of the accompanying drawings, in which like reference numerals indicate corresponding, analogous or similar elements.

FIG. 3 is an exemplary screenshot of a graphical user interface through which the supervisor may select an objective, according to embodiments of the present invention.

FIG. 5 is an exemplary screenshot of an agent action report, according to embodiments of the present invention.

FIGS. 7A-C are exemplary data flows of information between different components in an intelligent adherence/conformance analysis coaching system, according to embodiments of the invention.

DETAILED DESCRIPTION OF THE INVENTION

Figure 1:
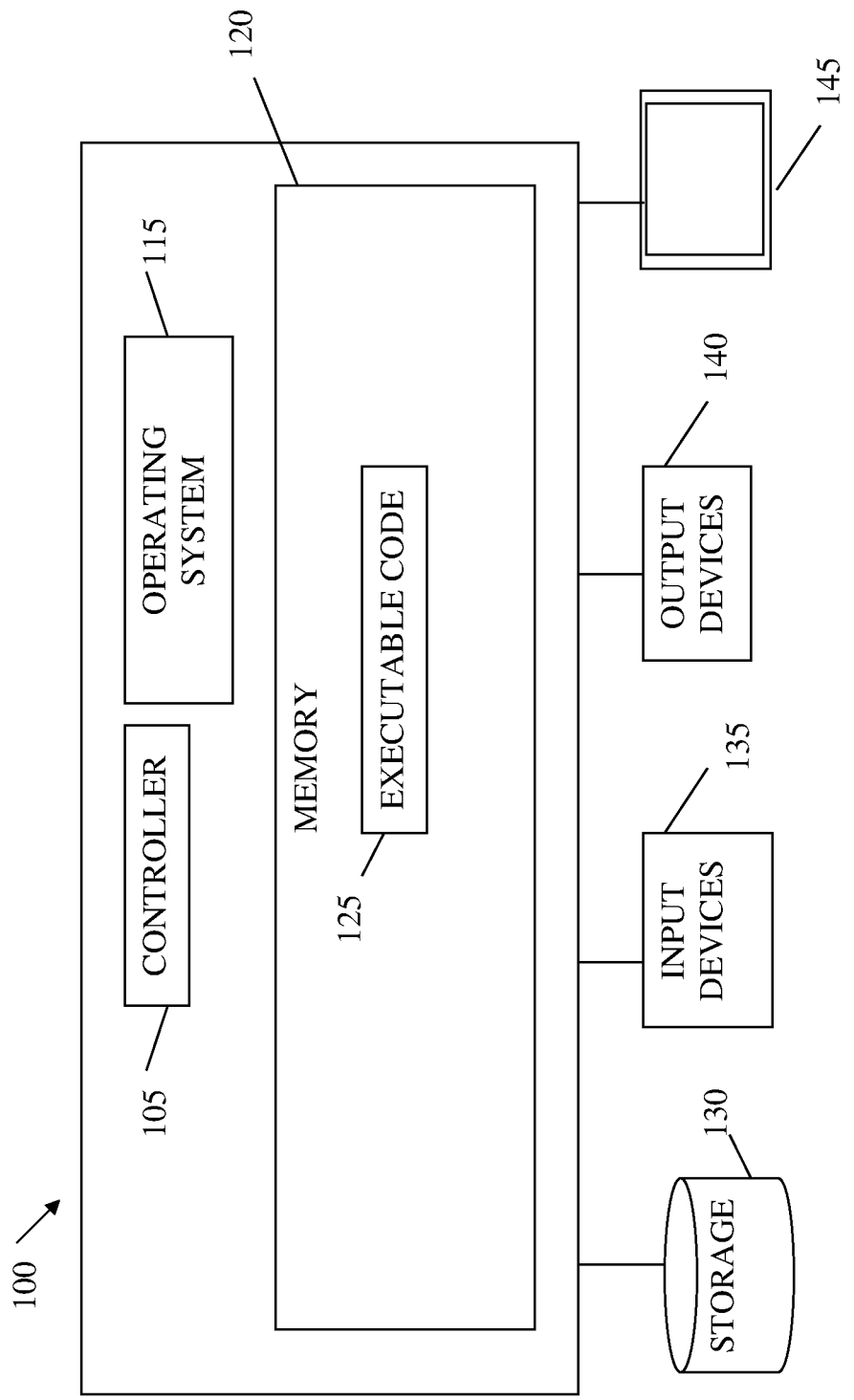
FIG. 1 is a block diagram of a computing device used with or executing embodiments of the present invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Embodiments of the invention pertain to the technology of call centers and may provide an improvement to this technology by, for example, by providing automated review of large amounts of adherence and/or conformance data for one or more employees or agents to identify the agents in need of coaching. Compared to typical manual methods of identifying agents in need of coaching, embodiments of the invention may be significantly quicker and more accurate at identifying agents in need of coaching. For example, embodiments of the invention may continually monitor agents scheduled for coaching to determine if any of the agents have improved enough before the coaching to cancel needless coaching, or to better tailor the coaching based on progress of the agent in-between scheduling the coaching and attending the coaching.

While a call center has been utilized as an example usage and context of embodiments of the present invention, the embodiments of the present invention may be utilized in any workforce management system. A workforce management system may be a system that utilizes an integrated set of technology processes to optimize productivity of employees, such as effectively forecasting labor requirements and creating and managing staff schedules to accomplish a particular task on a day-to-day and hour-to-hour basis.

As used herein, adherence data may include scheduled start and stop times for scheduled activities for each of one or more agents, and the actual start and stop times that each of the one or more agents actually performed the scheduled activities. Embodiments of the invention may, for each agent, automatically compare the scheduled start and stop times for the scheduled activities and the actual start and stop times that the scheduled activities were actually performed by the agent to determine an amount of time the agent is in adherence or an amount of time the agent is not in adherence.

As used herein, adherence may be a measure of how close in time a scheduled start and stop time for an activity is to the actual start and stop times that the scheduled activity was actually performed by the agent. The amount of time in adherence may be the amount of time of actual performance that is within the scheduled start and stop times, as in the following example equations:

if $(S_A \geq E_S)$ or $(E_A \leq S_S)$; $T_{IA}=0$     EQN. 1A if $(S_A > S_S)$ and $(E_A < E_S)$: $T_{IA}=E_A-S_A$     EQN. 1B if $(S_S < S_A < E_S)$ and $(E_A \geq E_S)$: $T_{IA}=E_S-S_A$     EQN. 1C if $(S_A \leq S_S)$ and $(E_S > E_A > S_S)$: $T_{IA}=E_A-S_S$     EQN. 1D where $T_{IA}$ is the amount of time in adherence; $S_A$ is the actual start time that the agent actually started performing the scheduled activity; $S_S$ is the scheduled start time for the scheduled activity; $E_A$ is the actual stop time that the agent actually stopped performing the scheduled activity; $E_S$ is the scheduled stop time for the scheduled activity; $ST_{total}$ is the scheduled total amount of time for the scheduled activity.

The amount of time out of adherence may be the amount of time the scheduled start and stop times does not fall within the actual start and stop times for an activity, as in the following example equations:

if $(S_A \geq E_S)$ or $(E_A \leq S_S)$: $T_{NIA}$=the greater of $(E_A-E_S)$ or $(S_S-S_A)$     EQN. 2A if $(S_A > S_S)$ and $(E_A < E_S)$: $T_{NIA}=ST_{total}-(E_A-S_A)$     EQN. 2B if $(S_S \leq S_A < E_S)$ and $(E_A > E_S)$: $T_{NIA}=(E_A-E_S)+(S_A-S_S)$     EQN. 2C if $(S_A < S_S)$ and $(E_S \geq E_A > S_S)$: $T_{NIA}=(E_A-E_S)+(S_A-S_S)$     EQN. 2D where $T_{NIA}$ is the amount of time out of adherence; $S_A$ is the actual start time that the agent actually started performing the scheduled activity; $S_S$ is the scheduled start time for the scheduled activity; $E_A$ is the actual stop time that the agent actually stopped performing the scheduled activity; $E_S$ is the scheduled stop time for the scheduled activity; $ST_{total}$ is the scheduled total amount of time for the scheduled activity.

As with other example formulas described herein, other formulas may be used. For example, if an agent was scheduled to perform a scheduled activity, such as answer or engage in telephone calls or other communications, from noon to 1:00 PM, but the agent performed the scheduled activity from 11:15 AM to noon, then the amount of time in adherence would be 0 and the amount of time out of adherence would be one hour. If the agent was scheduled to perform the scheduled activity from noon to 1:00 PM, but the agent performed the scheduled activity from 12:15 to 12:30, then the amount of time in adherence would be 15 minutes and the time out of adherence would be 45 minutes. If the agent was scheduled to perform the scheduled activity from noon to 1:00 PM, but the agent performed the scheduled activity from 12:15 to 1:30, then the amount of time in adherence would be 45 minutes and the amount of time not in adherence would be 45 minutes. If the agent was scheduled to perform the scheduled activity from noon to 1:00 PM, but the agent performed the scheduled activity from 11:00 to 1:00 PM, then the amount of time in adherence would be one hour and the amount of time out of adherence would be one hour.

Embodiments of the invention may automatically update the adherence data to include the amount of time each of the agents are in adherence or the amount of time each of the agents is not in adherence in the adherence data. Embodiments of the invention may automatically determine, for each agent, a percentage of adherence. The percentage of adherence may be a percentage in adherence or a percentage out of adherence.

The percentage in adherence may be a percentage that the amount of time in adherence for the scheduled activity is of the scheduled total amount of time for the scheduled activity, as in the following example equation:

$$P_{IA} = \left(\frac{T_{IA}}{ST_{total}}\right) \times 100\% \quad \text{EQN. 3}$$

where $P_{IA}$ is the percentage in adherence for a scheduled activity; $T_{IA}$ is the amount of time in adherence; and $ST_{total}$ is the scheduled total amount of time for the scheduled activity.

The percentage out of adherence may be a percentage that the amount of time not in adherence for the scheduled activity is of the scheduled total amount of time for the scheduled activity, as in the following example equation:

$$P_{OA} = \left(\frac{T_{NIA}}{ST_{total}}\right) \times 100\% \qquad \text{EQN. 4}$$

where $P_{OA}$ is the percentage out of adherence for a scheduled activity; $T_{NIA}$ is the amount of time not in adherence; and $ST_{total}$ is the scheduled total amount of time for the scheduled activity.

Embodiments of the invention may automatically update or store the adherence data to include the percentages of adherence in the adherence data.

As used herein, conformance data may include a scheduled total amount of time for each scheduled activity for each of the one or more agents, and the actual total amount of time the scheduled activities were actually performed by each of the agents. Embodiments of the invention may, for each agent, automatically compare the scheduled total amount of time for the scheduled activities for the agent and an actual total amount of time the scheduled activity was actually performed by the agent to determine an amount of time not in conformance.

As used herein, conformance may be a measure of how close a scheduled total amount of time for an activity is to an actual total amount of time the scheduled activity was actually performed by an agent.

The amount of time not in conformance may be the absolute value of the difference of the scheduled total amount of time for an activity and an actual total amount of time the scheduled activity was actually performed by an agent, as in the following example equation:

$$T_C = |ST_{total} - AT_{total}| \qquad \text{EQN. 5}$$

where $T_C$ is the amount of time not in conformance, $ST_{total}$ is the scheduled total amount of time for the activity; and $AT_{total}$ is the actual total amount of time the scheduled activity was actually performed by the agent.

For example, if an agent was scheduled to perform a scheduled activity, such as take or participate in communications such as telephone calls, for a total of one hour but the agent only performed the scheduled activity for 45 minutes, then the amount time out of conformance for that scheduled activity would be 15 minutes. Similarly, if the agent was scheduled to perform a scheduled activity for a total of one hour but the agent performed the scheduled activity for an hour and 15 minutes then the amount of time out of conformance would be 15 minutes.

Embodiments of the invention may automatically update the conformance data to include the amount of time in conformance or the amount of time not in conformance. Embodiments of the invention may automatically determine, for each agent, a percentage of conformance by comparing a sum of the amount of time the agent was in conformance or a sum of the amount of time the agent was not in conformance for each of the scheduled activities on that date, and a sum of the scheduled total amount of time for each of the scheduled activities on that date, as in the following example equation:

$$P_C = \left(\frac{AT_{total}}{ST_{total}}\right) \times 100\% \qquad \text{EQN. 6}$$

where $P_C$ is the percentage of conformance, $AT_{total}$ is the actual total amount of time the scheduled activity was actually performed by the agent, and $ST_{total}$ is the scheduled total amount of time for the activity.

Embodiments of the invention may automatically update the conformance data to include the percentages of conformance in the conformance data.

Embodiments of the invention may automatically determine if any of the agents require coaching based on, for example, a comparison of an objective selected (e.g. by the supervisor entering data and a system receiving data via a GUI) by a supervisor and adherence data or conformance data for the agent. The objective may be a goal measure of performance for an agent to meet in order to effectively perform in the call center or a goal measure of performance below which an agent is considered to be not performing effectively. For example, the objective may be a goal amount of occurrences of a goal amount of time in adherence or a goal amount of time in conformance to occur at a goal frequency, such as a percentage of adherence less than 85% for more than 3 times in the same week. The time in adherence may be $T_{IA}$ as calculated in EQNS. 1A-D or $P_{IA}$ as calculated in EQN. 3. An example of an objective utilizing adherence may be a percentage of adherence that is less than 85% for more than 3 times in the same week. The time in conformance may be $T_{NIA}$ as calculated in EQNS. 2A-D or $T_C$ as calculated in EQN. 5. An example of an objective utilizing conformance data may be a percentage of conformance that is less than 85% or more than 150% for more than 3 times in the same week. If any of the agents are determined not to need coaching, then embodiments of the invention will not automatically schedule coaching for such agents.

As used herein, goal may refer to a desired amount determined by the supervisor. For example, a goal amount of occurrences could be greater than or equal to 3 times. A goal amount of adherence or a goal amount of conformance could be adherence or conformance less than a predetermined or selected percentage and/or it could be adherence or conformance above a predetermined or selected percentage. A goal frequency could be a repeating period of time, such as every day, every week, every month etc. A goal amount of occurrences at a goal frequency (e.g. occurrences per time period) may be 6 times in a month, 3 times in a week or 2 times in a day.

Additionally, in contrast to typical call center technology, embodiments of the invention may, after identifying agents that have underperformed, and, thus require coaching to improve performance (e.g., improve adherence or improve conformance), automatically schedule coaching for the identified agents and alert the identified agent with information that the agents can utilize to improve their performance before the coaching. By providing the identified agents with information that the agents can utilize to improve their performance before the coaching and automatically canceling or adjusting training based on progress of the agent in-between scheduling the coaching and attending the coaching, embodiments of the invention may eliminate the need for coaching and/or reduce the amount of coaching necessary to improve agent performance. Additionally, by providing the identified agents with information that the agents can utilize to improve their performance before the coaching, the agent may be empowered, and, thus, may be more motivated to improve and less motivated to quit.

For example, embodiments of the invention may transmit an alert to each of the one or more agents that have been determined to require coaching, wherein the alert may include or have a link to information indicating why the agent has been determined to require coaching, such as that the agent did not meet the objective based on the automatic comparison of the objective to the agent's adherence or conformance data. The information indicating why the agent has been determined to require coaching may also include which scheduled activities the agent did not meet the goal amount of adherence or goal amount of conformance, the corresponding dates/times or total amount of time those scheduled activities should have been performed and the actual dates/times or total amount of time those scheduled activities were actually performed, and the predetermined/selected objective.

For example, the alert may include or be a link to more information indicating why the agent has been determined to require coaching. For example, when an agent clicks on or otherwise provides input to the alert, an objective results dashboard may be displayed. The alert may be displayed on an agent dashboard displayed on a graphical user interface, such as the agent dashboard shown in FIG. 6. The objective results dashboard may include information that indicates whether the objective is an adherence objective or a conformance objective, each date that the agent's adherence or conformance was under the goal percentage of adherence or goal percentage of conformance for a day, a percentage of adherence or a percentage of conformance for each date that the agent's adherence or conformance was under the goal percentage of adherence or goal percentage of conformance, respectively, a difference between the percentage of adherence or the percentage of conformance and the goal percentage of adherence or goal percentage of conformance, respectively, the goal, the amount of occurrences of meeting the goal at the goal frequency, a date an agent action report was sent, and a link to details of the agent action report.

The agent action report may include the agents name and identification ("ID") number, each date the agent did not meet the goal amount of occurrences of the goal amount of adherence or goal amount of conformance during a predetermined date range or a date range selected by the supervisor, the types of each scheduled activity for the agent, the scheduled start and stop times for each scheduled activity, the scheduled total amount of time to perform each scheduled activity, the actual start and stop times the agent actually performed each scheduled activity, the actual total amount of time the agent actually performed each scheduled activity, an amount of time in adherence and an amount of time out of adherence for each scheduled activity, an amount of time in conformance and an amount of time out of conformance for each scheduled activity, a percentage in conformance for each scheduled activity, a percentage in adherence for each scheduled activity, for each date, a percentage representing how much total time each scheduled activity was scheduled divided by the total amount of scheduled time for that date, for each date, a percentage representing how much total time each scheduled activity was actually performed divided by the total amount of time the agent actually worked for that date, and an amount of occurrences that that the agent did not meet the goal amount of adherence or conformance.

The alert may also include an icon or link which displays a tool tip (e.g., a message which appears when a cursor is positioned over the icon in the alert or when the icon is clicked) which indicates that the alert is an alert generated based on the agent's adherence and/or conformance.

Embodiments of the invention may improve the technology behind the operation of call centers, for example, by automatically scheduling coaching for the identified agents in hours in which the identified agents are scheduled to work and in hours in which the actual workforce is larger than a needed workforce, or, more specifically, automatically scheduling coaching for the identified agents in hours in which the actual workforce that perform the same activities as the identified agents is larger than a needed workforce to perform the same activities as the identified agents. Thus, embodiments of the invention may automatically schedule coaching for the identified agents in a way that does not impact the performance of the call center. Embodiments of the invention may also automatically monitor performance of the agent after receiving the coaching to determine if more or different coaching is needed.

Reference is made to FIG. 1, which is a block diagram of a computing device 100 used with or executing embodiments of the present invention. The computing device 100 may include one or more computer processors or controllers 105 that may be, for example, a central processing unit processor (CPU), a chip or any suitable computing or computational device, an operating system 115, a memory 120, a storage 130, input devices 135, an output devices 140, and one or more monitors or displays 145.

Operating system 115 may be or may include any code segment designed and/or configured to perform tasks involving coordination, scheduling, arbitration, supervising, controlling or otherwise managing operation of computing device 100, for example, scheduling execution of programs. Operating system 115 may be a commercial operating system. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, or other suitable memory units or storage units. Memory 120 may be or may include one or more, possibly different memory units.

Executable code 125 may be any executable code, e.g., an application, a program, a process, task or script. Executable code 125 may be executed by controller 105 possibly under control of operating system 115. For example, executable code 125 may be an application that performs methods for displaying a graphical user interface, comparing adherence data or conformance data to the objective, scheduling coaching sessions, and transmitting alerts, etc., as described herein. Where applicable, executable code 125 may carry out operations described herein in real-time. The processor 100 and executable code 125 may be configured to update, process and/or act upon information at the same rate the information, or a relevant event, are received. In some embodiments, more than one computing device 100 may be used. Methods for displaying a graphical user interface, comparing adherence data or conformance data to the objective, scheduling coaching sessions, and transmitting alerts, etc., as described herein may be performed in real-time by executable code 125 when executed on the one or more processors 100.

Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data, such as adherence data or conformance data, schedules of coaching sessions, and reports, or code used by method according to embodiments of the invention may be stored in storage 130 and may be loaded from storage 130 into memory 120 where it may be processed by controller 105.

Input devices 135 may be or may include a mouse, a keyboard, a touch screen or pad or any suitable input device. Output devices 140 may be or include speakers and/or any other suitable output devices. Any applicable input/output (I/O) devices may be connected to computing device 100 as shown by blocks 135 and 140. The one or more monitors or displays 145 may be a cathode-ray tube ("CRT") monitor, a liquid crystal display ("LCD") monitor, or light emitting diode ("LED") monitor.

Embodiments of the invention may include an article such as a non-transitory computer or processor readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 120 may store executable code 125 such that controller 105 is configured to carry out embodiments disclosed herein by executing code 125.

Figure 2:
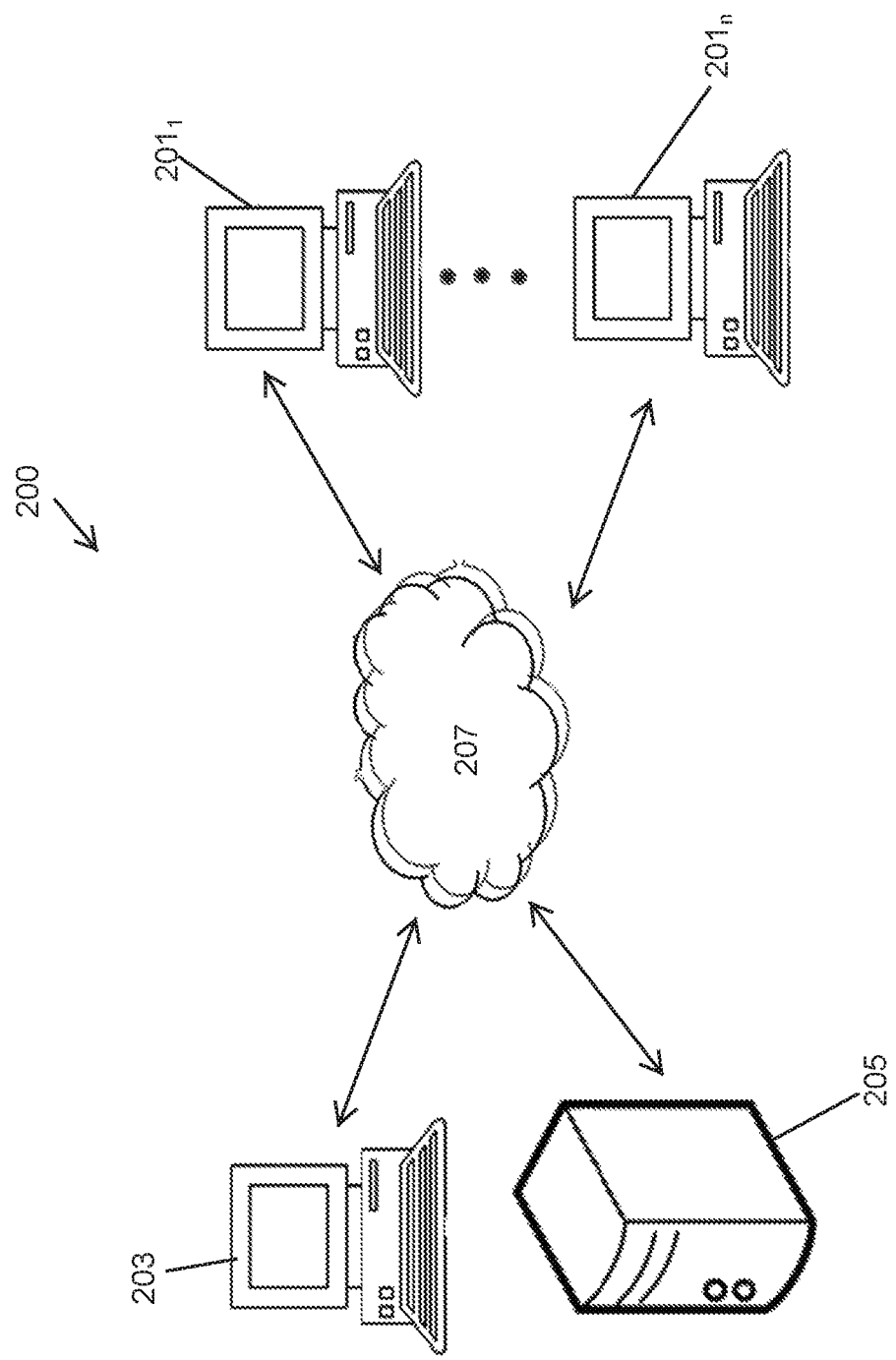
FIG. 2 is an exemplary intelligent adherence/conformance analysis coaching system, according to embodiments of the present invention.

FIG. 2 depicts an exemplary intelligent adherence/conformance analysis coaching system 200, according to embodiments of the present invention.

System 200 may include one or more of agent devices $201_1$-$201_n$, a supervisor device 203, a server 205, and a network 207. The agent devices $201_1$-$201_n$, the supervisor device 203, and the server 205 may communicate via the network 207.

One or more agent devices $201_1$-$201_n$ may be or may include one or more processors (e.g., computing device 100 of FIG. 1). The one or more of agent devices $201_1$-$201_n$ may be utilized by agents to provide telephone-based support or online support forums for Internet-based support, for example, to provide customers with technical support, sell products, schedule appointments, or otherwise interact or communicate with customers.

The supervisor device 203 may be or may include one or more processors (e.g., computing device 100 of FIG. 1). The supervisor device 203 may be configured to allow, by receiving input from the one or more processors, a supervisor to assign scheduled total amounts of time and scheduled start and stop times for each scheduled activity for each of the agents utilizing the one or more of agent devices $201_1$-$201_n$. For example, scheduled activities may be tasks, such as answering customer service calls or selling products, or breaks, such as a coffee break or lunch break.

The one or more of agent devices $201_1$-$201_n$ may be configured to track the actual total amount of time and the actual start and stop times that each scheduled activity was actually performed by each of the agents. Alternatively, each agent may manually track the actual total amount of time and the actual start and stop times that each scheduled activity was actually performed, and the one or more of agent devices $201_1$-$201_n$ may be configured to allow the agents to input their tracked actual total amount of time and the actual start and stop times. The one or more of agent devices $201_1$-$201_n$ may be configured to transmit the tracked actual total amount of time and the actual start and stop times to the supervisor device 203 and/or to the server 205.

The server 205 may be or may include one or more processors (e.g., computing device 100 of FIG. 1). The server 205 and/or supervisor device 203 may be configured to calculate adherence data and/or conformance data for each scheduled activity for each of the agents.

The adherence data may include, for each of one or more of scheduled activities for each agent, an amount of time in adherence or an amount of time not in adherence based on a comparison of the scheduled start and stop times for the scheduled activity and the actual start and stop times that the scheduled activity was actually performed by the agent. The comparison may be that the server 205 and/or supervisor device 203 calculates the amount of time in adherence and the amount of time not in adherence by utilizing EQNS. 1A-D and 2A-D, respectively.

The adherence data may also include, for each of one or more scheduled activities for each agent, a percentage of adherence. The percentage of adherence may be a percentage in adherence or a percentage out of adherence. The server 205 and/or supervisor device 203 may be configured to calculate a percentage in adherence, based on a comparison of the amount of time in adherence for the scheduled activity and the scheduled total amount of time for the scheduled activity (e.g., by utilizing EQN. 3).

The server 205 and/or supervisor device 203 may be configured to calculate a total percentage in adherence for each day for each agent by summing each amount of time in adherence (e.g., each amount of time in adherence calculated utilizing EQNS. 1A-D), for each scheduled activity for the agent for that day to get a total time in adherence (e.g., in minutes), summing each of the scheduled total amount of time for each scheduled activity for the agent for that day to get a total scheduled total amount of time (e.g., in minutes), and determining what percentage of the total scheduled total amount of time for the agent for that day that the total time in adherence for the agent for that day is, as in the following example equation:

$$TPA = \left(\frac{TTA}{TST}\right) \times 100\% \qquad \text{EQN. 7}$$

where TPA is a total percentage in adherence for an agent for a day, TTA is a total time in adherence for the agent for the day, and TST is a total scheduled total amount of time for each of the scheduled activities for the agent for the day.

In some embodiments of the invention, the server 205 and/or supervisor device 203 may be configured to calculate a percentage out of adherence for each scheduled activity, based on a comparison of the amount of time not in adherence for the scheduled activity and the scheduled total amount of time for the scheduled activity (e.g., by utilizing EQN. 4). In some embodiments of the invention, the server 205 and/or supervisor device 203 may be configured to calculate a total percentage out of adherence for each day for each agent by summing each of the percentages out of adherence for the scheduled activities for the agent for the day.

The conformance data may include, for each of one or more scheduled activities for each agent, an amount of time not in conformance based on a comparison of the scheduled total amount of time for the scheduled activity and the actual total amount of time the scheduled activity was actually performed by the agent. The server 205 may be configured to calculate the amount of time not in conformance by utilizing EQN. 5.

The server 205 may be configured to calculate a percentage of conformance for each scheduled activity, based on a comparison of actual total amount of time the scheduled activity was actually performed by the agent and the scheduled total amount of time for the scheduled activity (e.g., by utilizing EQN. 6). In some embodiments of the invention, the server 205 may be configured to calculate a total percentage of conformance for each day for each agent by summing each amount of time not in conformance (e.g., each amount of time not in conformance calculated utilizing EQN. 5), for each scheduled activity for the agent for that day to get a total time out of conformance (e.g., in minutes), summing each of the scheduled total amount of time for each scheduled activity for the agent for that day to get a total scheduled total amount of time (e.g., in minutes), and determining what percentage of the total scheduled total amount of time for the agent for that day that the total time out of conformance for the agent for that day is, as in the following example equation:

$$TPC = \left(\frac{TTC}{TST}\right) \times 100\% \qquad \text{EQN. 8}$$

where TPC is a total percentage of conformance for an agent for a day, TTC is a total time not in conformance for the agent for the day, and TST is a total scheduled total amount of time for each of the scheduled activities for the agent for the day.

The supervisor device 203 may be configured to display a graphical user interface on the monitor which allows a supervisor to select a date range (e.g. defined by a start day and end day) and an objective.

The selected date range may be a time period, which the server 205 and/or supervisor device 203 may be configured to automatically analyze the adherence and/or conformance data for each of one or more of agents for the selected date range to determine if any of the agents require coaching. For example, the selected date range may be from Jan. 1, 2019 to Feb. 1, 2019. The selected objective may be a goal amount of occurrences of a goal amount of adherence or a goal amount of conformance to occur at a goal frequency.

For example, a goal amount of adherence may be a total percentage in adherence (TPA) below a first predetermined amount of adherence, such as 85% or may be a total percentage not in adherence above a second predetermined amount of adherence, such as 15%. A goal amount of conformance may be a total percentage of conformance (TPC) above a first predetermined amount of conformance, such as 150%, and/or a total percentage of conformance (TPC) below a second predetermined amount of conformance, such as 50%. A goal amount of occurrences of a goal amount of adherence may be a predetermined amount of time, such as three times, that the total percentage in adherence (TPA) is below the first predetermined amount of adherence. In some embodiments of the invention, the goal amount of occurrences of the goal amount of adherence may be the predetermined amount of time that the total percentage out of adherence is above the second predetermined amount of adherence. A goal frequency may be every week, every month, etc. during the selected date range.

An example objective may be a total percentage in adherence (TPA) below 85% or a total percentage not in adherence above 15% more than three times a week during the selected date range. Another example objective may be a total percentage of conformance (TPC) above 150% more than three times a week during the selected date range and/or a total percentage of conformance (TPC) below 50% more than three times a week during the selected date range.

Depending on the type of scheduled tasks for each agent, the supervisor may select through the graphical user interface whether the objective should be based on adherence and/or conformance. For example, if the agent is primarily scheduled to perform sales, the supervisor may select that the objective is based on adherence because if agents do not adhere to the start and stop times scheduled to them, too many agents could be working at the same time, which could result in not enough agents being available for making sales at other times during the day. However, if the agent is primarily scheduled to perform customer support, which typically takes longer than sales and/or the total amount of time required to perform is not predictable (e.g., different support issues can widely vary in total amount of time to solve), the supervisor may select that the objective is based on conformance because the start and stop times may not be as important as the total amount of time the agent performs customer support. For example, if a customer calls the agent for service questions right before the agent's scheduled lunch break, it is not desirable to have the agent prematurely end the call to makes sure the agent adheres to the start and stop times of the lunch break. Rather, in such a scenario it is more important that the agent is able to answer the service questions, such as solve the problem experienced by the caller, and the conformance data could be utilized to determine if the agent is not alleviating the problems fast enough, and therefore needs coaching/training.

Figure 3:
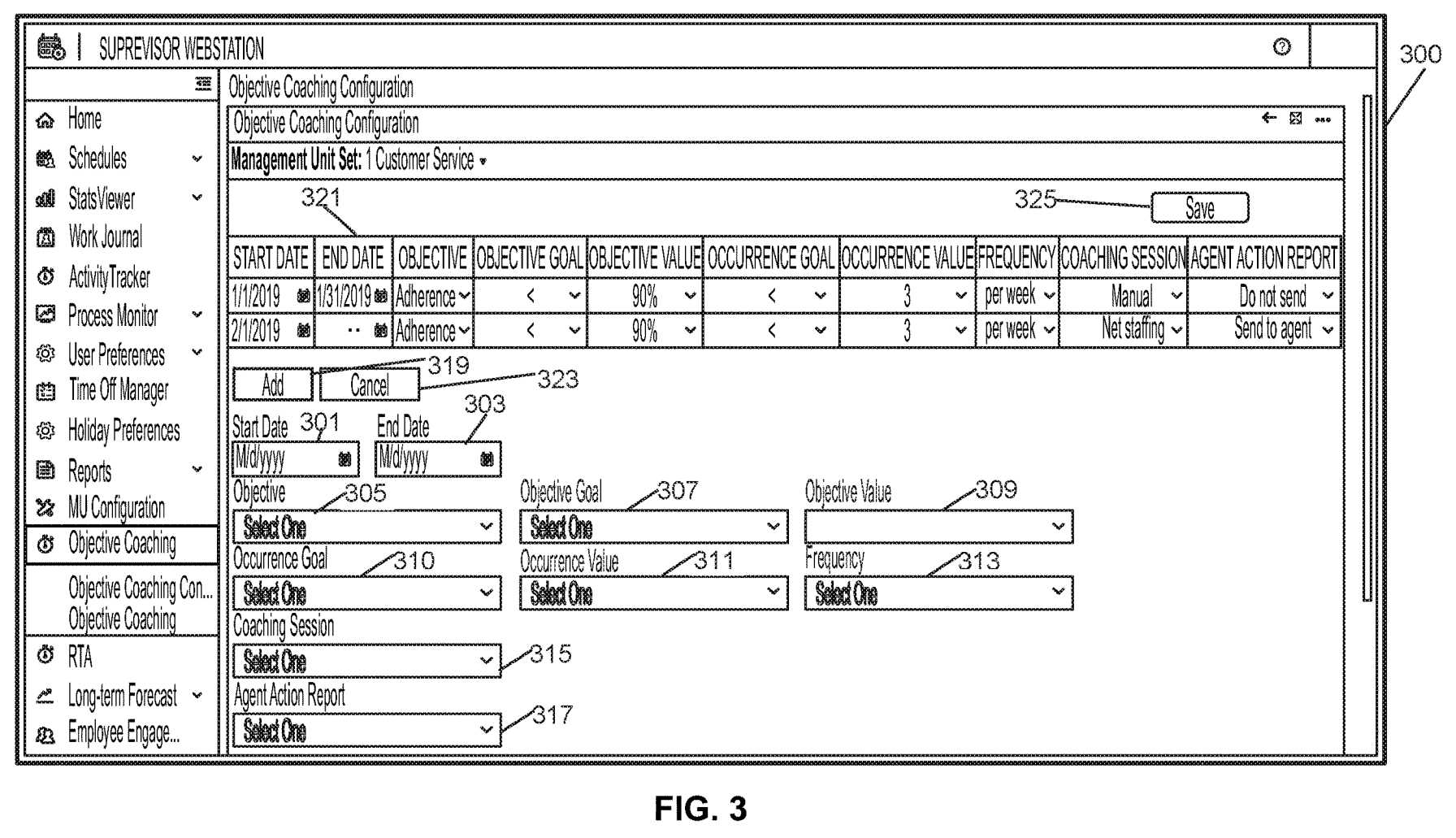

Reference is made to FIG. 3, which is an exemplary screenshot of a graphical user interface 300 through which the supervisor may select the objective, according to embodiments of the present invention. The supervisor device 203 may be configured to allow the supervisor to select, via the graphical user interface 300, the start 301 and end dates 303 for the date range which the server 205 or supervisor device 203 automatically analyzes the adherence or conformance data. The supervisor device 203 may be configured to allow the supervisor to be able to select in an objective type input box 305 whether adherence data or conformance data is automatically analyzed and compared to the objective. The supervisor device 203 may be configured to allow the supervisor to select an objective goal 307, such as whether the identification requires that the adherence or conformance is greater than, less than, equal to, greater than or equal to, less than or equal to, or within a range of a selected objective value 309. The supervisor device 203 may be configured to allow the supervisor to select the objective value 309, such as the goal amount of adherence or the goal amount of conformance, depending on whether adherence or conformance is selected in the objective type input box 305. The supervisor device 203 may be configured to allow the supervisor to select an occurrence goal 310, such as whether identification requires that the amount of occurrences of adherence or conformance meeting the objective goal 307 and objective value 309 is greater than, less than, equal to, greater than or equal to, less than or equal to, or within a range of a selected occurrence value 311. The supervisor device 203 may be configured to allow the supervisor to select the occurrence value 311, such as the goal amount of occurrences of the objective value 309. The supervisor device 203 may be configured to allow the supervisor to select a goal frequency 313. The supervisor device 203 may be configured to allow the supervisor to select a type of coaching session 315, such as manual or net staffing, to either manually schedule coaching or to automatically schedule coaching based on net staffing. The supervisor device 203 may be configured to allow the supervisor to select whether to automatically send or not send 317 an agent action report to an agent which meets the objective selected by the supervisor. The agent action report may be utilized by the agent to see the specific areas that need to be addressed to improve their adherence/conformance. The agent action report is discussed in detail in the below description of FIG. 5.

The supervisor device 203 may be configured to allow the supervisor to add 319 the selected objective (e.g., the selected start 301 and end dates 303, the objective type 305, the objective goal 307, the objective value 309, the occurrence goal 310, the occurrence value 311, and the goal frequency 313) and the automated actions (e.g., what type of coaching session 315 will be assigned and whether an agent action report will be sent 317 to an agent which meets the selected objective) to a list of selected objectives 321 or allow the supervisor to cancel 323 the selected objective.

The supervisor device 203 may be configured to display a list of added objectives and corresponding added automated actions, allow the supervisor to edit the added objectives and corresponding added automated actions, and allow the supervisor to save 325 the edits to the list of added objectives 321.

The supervisor device 203 may be configured to transmit a selected objective and corresponding automated action and, if a selected objective or corresponding automated actions is edited, transmit the edited objective and corresponding automated actions to the server 205.

The server 205 and/or supervisor device 203 may be configured to, determine if any agents require coaching by comparing the adherence data calculated by the server 205 and/or supervisor device 203 at the goal frequency (e.g., the goal frequency selection 313 of FIG. 3) to the goal amount of occurrences (e.g., the occurrence value selection 311 of FIG. 3) of the goal amount (e.g., the objective value selection 309 of FIG. 3) of adherence at the goal frequency, or by comparing the conformance data calculated by the server 205 and/or supervisor device 203 at the goal frequency to the goal amount of occurrences of the goal amount of conformance at the goal frequency, depending on whether adherence or conformance, respectively, was selected for the objective type (e.g., objective type 305 of FIG. 3).

For example, if adherence was selected for the objective type and less than was selected for the objective goal, the server 205 and/or supervisor device 203 may be configured to determine an amount of adherence days (e.g., days in the selected date range 301 and 303, which the total percentage in adherence ($P_{LA}$) is less than the selected objective value). The server 205 and/or supervisor device 203 may be configured to identify any agent which has an amount of nonadherence days at the goal frequency which is greater than the goal amount of occurrences of the goal amount of adherence at the goal frequency.

If adherence was selected for the objective type and greater than was selected for the objective goal, the server 205 and/or supervisor device 203 may be configured to determine an amount of nonadherence days (e.g., days in the selected date range 301 and 303, which the total percentage not in adherence ($P_{NIA}$) is greater than the selected objective value, such as a second predetermined amount of adherence). The server 205 and/or supervisor device 203 may be configured to identify any agent which has an amount of adherence days at the goal frequency which is less than the goal amount of occurrences of the goal amount of adherence at the goal frequency. In some embodiments of the invention, the server 205 and/or supervisor device 203 may be configured to, for each of the one or more of agents that have been scheduled for a coaching session, cancel the coaching session if an amount of nonadherence days during a predetermined subsequent period of time is less than a first predetermined threshold or a difference between the amount of nonadherence days during the predetermined subsequent period of time at the goal frequency and the amount of nonadherence days during the date range at the goal frequency is less than a second predetermined threshold. The predetermined subsequent period of time may be between after the selected date range ends and the time that the agent was scheduled for the coaching session.

If conformance was selected for the objective type, the server 205 and/or supervisor device 203 may be configured to determine an amount of conformance days (e.g., days in the selected date range 301 and 303, which the total percentage of conformance ($P_C$) is above the selected objective value, such as a predetermined amount of conformance). The server 205 and/or supervisor device 203 may be configured to identify any agent which has an amount of conformance days at the goal frequency which is greater than the goal amount of occurrences of the goal amount of conformance at the goal frequency. In some embodiments of the invention, the server 205 and/or supervisor device 203 may be configured to, for each of the one or more of agents that have been scheduled for a coaching session, cancel the coaching session if an amount of nonconformance days during the predetermined subsequent period of time is less than a third predetermined threshold, or a difference between the amount of nonconformance days during the predetermined subsequent period of time at the goal frequency and the amount of nonconformance days during the date range at the goal frequency is less than a fourth predetermined threshold.

Figure 4:
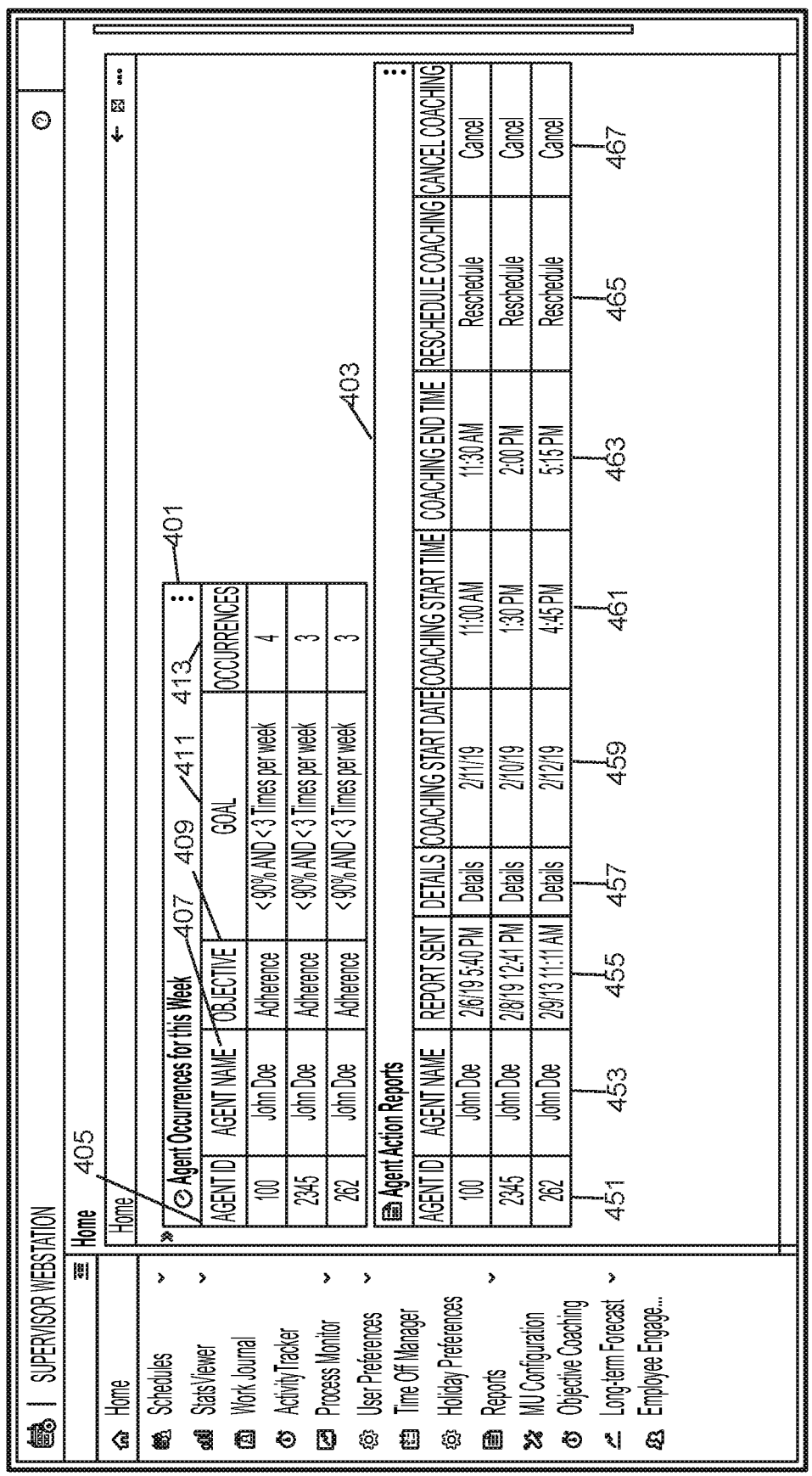
FIG. 4 is an exemplary screenshot of a graphical user interface displaying a supervisor dashboard, according to embodiments of the present invention.

Reference is made to FIG. 4, which is an exemplary screenshot of a graphical user interface displaying a supervisor dashboard, according to embodiments of the present invention.

The supervisor device 203 may be configured to allow the supervisor to view, via the graphical user interface, one or more agent occurrences tables 401 and an agent action reports table 403.

The supervisor dashboard may display an occurrences table 401 for each period of the selected frequency (e.g., in goal frequency selection 313) in which the amount of dates at least one agent met (e.g., the objective goal selection 307) the goal amount (the objective value selection 309) of adherence or conformance (e.g., depending on the objective type selection 305) met the goal amount of occurrences (e.g., the occurrence value selection 311).

Each of the agent occurrences tables 401 may include an agent ID column 405 listing the agent IDs of the agents which have been identified as requiring coaching based on the agents' performance during the period of the selected frequency; an agent name column 407 listing the corresponding agent names; an objective type column 409 listing whether adherence or conformance was selected for the objective type (e.g., objective type selection 305 of FIG. 3); a goal column 411 listing the objective (e.g., the objective goal selection 307, the objective value selection 309, the occurrence goal selection 310, the occurrence value selection 311, and the goal frequency selection 313 in FIG. 3); and an occurrences column 413 listing the amount of times the identified agent has met the corresponding objective in columns 409 and 411 during the period of the selected frequency.

The agent action reports table 403 may include an agent ID column 451 listing the agent IDs of the agents which have been identified as requiring coaching based on the agents' performance during the period of the selected frequency; an agent name column 453 listing the corresponding agent names; a report sent column 455 listing whether and when an agent action report was sent to the identified agent along with the alert; a details column 457, which includes links for each agent action report sent, a coaching start date column 459 listing the date which the agent has been scheduled for coaching; a coaching start time column 461 and a coaching end time column 463 listing the start and end times, respectively, of the coaching session, a reschedule coaching column 465, which includes buttons which allow the supervisor to reschedule the coaching sessions; and a cancel coaching session column 467, which includes buttons which allow the supervisor to cancel the coaching sessions. The supervisor device 203 may be configured to display the corresponding agent action report when an agent action report link, in the details column 457, is clicked.

Reference is made to FIG. 5, which is an exemplary screenshot of an agent action report, according to embodiments of the present invention.

The agent action report may include a date column 501, an agent ID column 503, an agent name column 505, a scheduled activities column 507, a scheduled time column 509, an actual time column 511, an in adherence column 513, an out of adherence column 515, a percent in adherence column 517, a conformance column 519, a percentage of conformance column 521, a percent of total schedule column 523, a percent of actual column 525, and an occurrence column 527.

The date column 501 may list each date, in a period of the selected frequency (e.g., in 313), that the agent worked. For example, if the frequency is every week, then each agent action report may cover one week.

The agent ID column 503 may list the agent ID of the agent. The agent name column 505 may list the agent's name. The scheduled activities column 507 may list each activity scheduled for the agent for each of the dates listed in the date column 501. The scheduled time column 509 may list the scheduled total amount of time for each of the listed scheduled activities. The actual time column 511 may list the actual total amount of time each of the listed scheduled activities was actually performed by the agent. In some embodiments of the invention, the agent action report may include columns listing the actual start and stop times the scheduled activities were actually performed by the agent and columns listing the scheduled start and stop times for the scheduled activities.

The in adherence column 513 may list, for each listed scheduled activity, an amount of time that the actual start and stop times that the scheduled activity was actually performed by the agent was in adherence to the scheduled start and stop times for the scheduled activity. The values in the in adherence column 513 may have been automatically calculated by the server 205 by utilizing EQNS. 1A-D The out of adherence column 515 may list, for each listed scheduled activity, an amount of time that the actual start and stop times that the scheduled activity was actually performed by the agent was not in adherence to the scheduled start and stop times for the scheduled activity. The values in the out of adherence column 515 may have been automatically calculated by the server 205 by utilizing EQNS. 2A-D.

The percent in adherence column 517 may list, for each listed scheduled activity, the percentage of the total scheduled amount of time in column 509 the value in the in adherence column 513 is. The values in the in adherence column 517 may have been automatically calculated by the server 205 by utilizing EQN. 3. In some embodiments of the invention, the agent action report may include a percent not in adherence column. The percentage not in adherence column may lists, for each listed scheduled activity, the percentage of the total scheduled amount of time in column 509 the value in the out of adherence column 515 is. The values in the not in adherence column may have been automatically calculated by the server 205 by utilizing EQN. 4.

The conformance column 519 may list, for each listed scheduled activity, the absolute value of the difference between the total amount of time that the agent actually performed the scheduled activity in the actual time column 511 and the scheduled total amount of time for the scheduled activity in the scheduled time column 509. The values in the conformance column 519 may have been automatically calculated by the sever 205 by utilizing EQN. 5. The percentage of conformance column 521 may list, for each listed scheduled activity, the percentage of the total scheduled amount of time in column 509 the value in the conformance column 519 is. The values in the percentage of conformance column 521 may have been automatically calculated by the sever 205 by utilizing EQN. 5.

The percentage of total schedule column 523 may list, for each listed scheduled activity, the percentage that the scheduled total amount of time in 509 is of the total of each of the scheduled total amounts of time in 509 for the date in the date column 501. The percent of actual column 525 may list, for each listed scheduled activity, the percentage that the actual amount of time in 511 is of the scheduled total amounts of time in 509 for the date in the date column 501.

For each date listed in the date column 501, there may be a total row (531, 533, and 535) which lists the totals for each of the values in the scheduled time column 509, the actual time column 511, the in adherence column 513 listing, the out of adherence column 515, the percent in adherence column 517, the conformance column 519, the percentage of conformance column 521, a percent of total schedule column 523, and the a percent of actual column 525. The value in the percent in adherence column 517 of the total rows 531, 533, and 535 may be the percentage of the total scheduled amount of time in column 509 of the corresponding total row 531, 533, or 535 that the value in the in adherence column 513 of the corresponding total row 531, 533, or 535 is. The value in the percentage of conformance column 521 of the total rows 531, 533, and 535 may be the percentage of the total scheduled amount of time in column 509 of the corresponding total row 531, 533, or 535 that the value in the conformance column 519 of the corresponding total row 531, 533, or 535 is.

The occurrence column 527 may display an indication, such as a check mark or the number one, or another indication, in the total rows 531, 533, and 535 for each date that the agent met (e.g., the objective goal selection 307) the goal amount (the objective value selection 309) of adherence or conformance (e.g., depending on the objective type selection 305). The agent action report may display an occurrence total 529 which is the sum of all the values in the occurrence column 527.

The agent action report may list, for each corresponding period of the goal frequency within the selected date range, a total amount of occurrences where the agent met (e.g., the objective goal selection 307) the goal amount (the objective value selection 309) of adherence or conformance (e.g., depending on the objective type selection 305).

The supervisor device 203 or server 205 may be configured to utilize the agent action reports to automatically determine whether any of the agents identified as requiring coaching, which have not yet received the required coaching, no longer require coaching. For example, the supervisor device 203 or server 205 may be configured to compare the agent action report which indicates that the agent requires coaching with a predetermined amount of subsequent agent action report(s) generated before the date of the required coaching. The supervisor device 203 or server 205 may be configured to cancel the scheduled coaching if a difference between the occurrence total 529 of the agent action report indicating that the agent requires coaching and the occurrence total(s) in each of the predetermined amount of subsequent agent action report(s) is greater than a predetermined amount of improvement.

The supervisor device 203 or server 205 may be configured to utilize the agent action reports to automatically determine whether any of the agents which have received coaching require additional coaching or have rectified the issue that required the coaching. For example, the supervisor device 203 or server 205 may be configured to compare the agent action report which indicates that the agent requires coaching with a predetermined amount of subsequent agent action report(s) generated after the date the agent received coaching. The supervisor device 203 or server 205 may be configured to schedule additional training if a difference between the occurrence total 529 of the agent action report indicating that the agent requires coaching and each of the predetermined amount of subsequent agent action report(s) is not greater than a predetermined amount of improvement.

Figure 6:
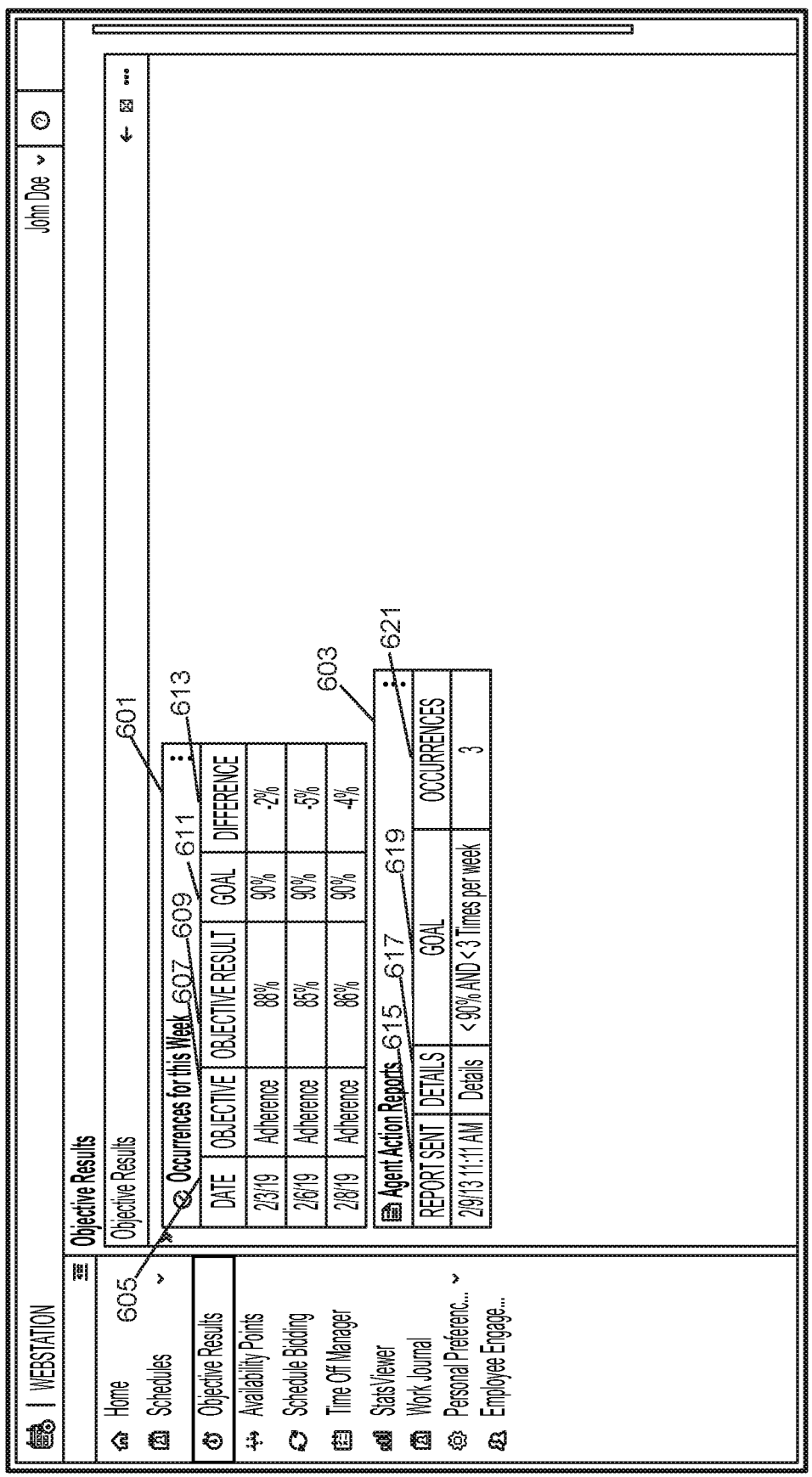
FIG. 6 is an exemplary screenshot of a graphical user interface displaying an agent dashboard, according to embodiments of the present invention.

Reference is made to FIG. 6, which is an exemplary screenshot of a graphical user interface displaying an agent dashboard, according to embodiments of the present invention.

The agent devices $201_1$-$201_n$ may be configured to allow an agent to view, via the graphical user interface, an occurrences table 601 and an agent action reports table 603.

The agent dashboard may display an occurrences table 601 for each period of the selected frequency (e.g., in goal frequency selection 313) in which the amount of dates the agent met (e.g., the objective goal selection 307) the goal amount (the objective value selection 309) of adherence or conformance (e.g., depending on the objective type selection 305) met the goal amount of occurrences (e.g., the occurrence value selection 311).

Each occurrences table 601 may include a date column 605, an objective type column 607, an objective result column 609, a goal column 611, and a difference column 613. The date column 605 may list each date in the period of the selected frequency on which the agent met the goal amount of adherence or conformance. The objective type column 607 may list whether adherence or conformance was selected for the objective type (e.g., objective type selection 305 of FIG. 3).

The objective result column 609 may list the percentage of adherence (either the percentage in adherence calculated by the server utilizing EQN. 3 or the percentage out of adherence calculated by the server utilizing EQN. 4) or the percentage of conformance (calculated by the server 205 utilizing EQNS. 6-8), depending on whether adherence or conformance, respectively, was selected as the objective type. The goal column 609 may list the goal amount of adherence/conformance (e.g., the objective value selection 309). The difference column 613 may list the difference between the amounts listed in the objective result column 609 and the goal column 611.

The agent action reports table 603 may display, for each agent action report sent to the agent, a report sent column 615 indicating when the agent action report was sent, a details column 617, a goal column 619, and an occurrences column 621. The details column 617 may links for each agent action report sent. The agent devices $201_1$-$201_n$ may be configured to display the corresponding agent action report when an agent action report link, in the details column 617, is clicked. The goal column 619 listing the objective (e.g., the objective goal selection 307, the objective value selection 309, the occurrence goal selection 310, the occurrence value selection 311, and the goal frequency selection 313 in FIG. 3). The occurrences column 621 may list the amount of times the identified agent has met the corresponding objective in columns 619 during the period of the selected frequency.

The data in agent action report may give the agent insight, before receiving formal coaching, as to what the agent needs to improve or fix.

Figure 7A:
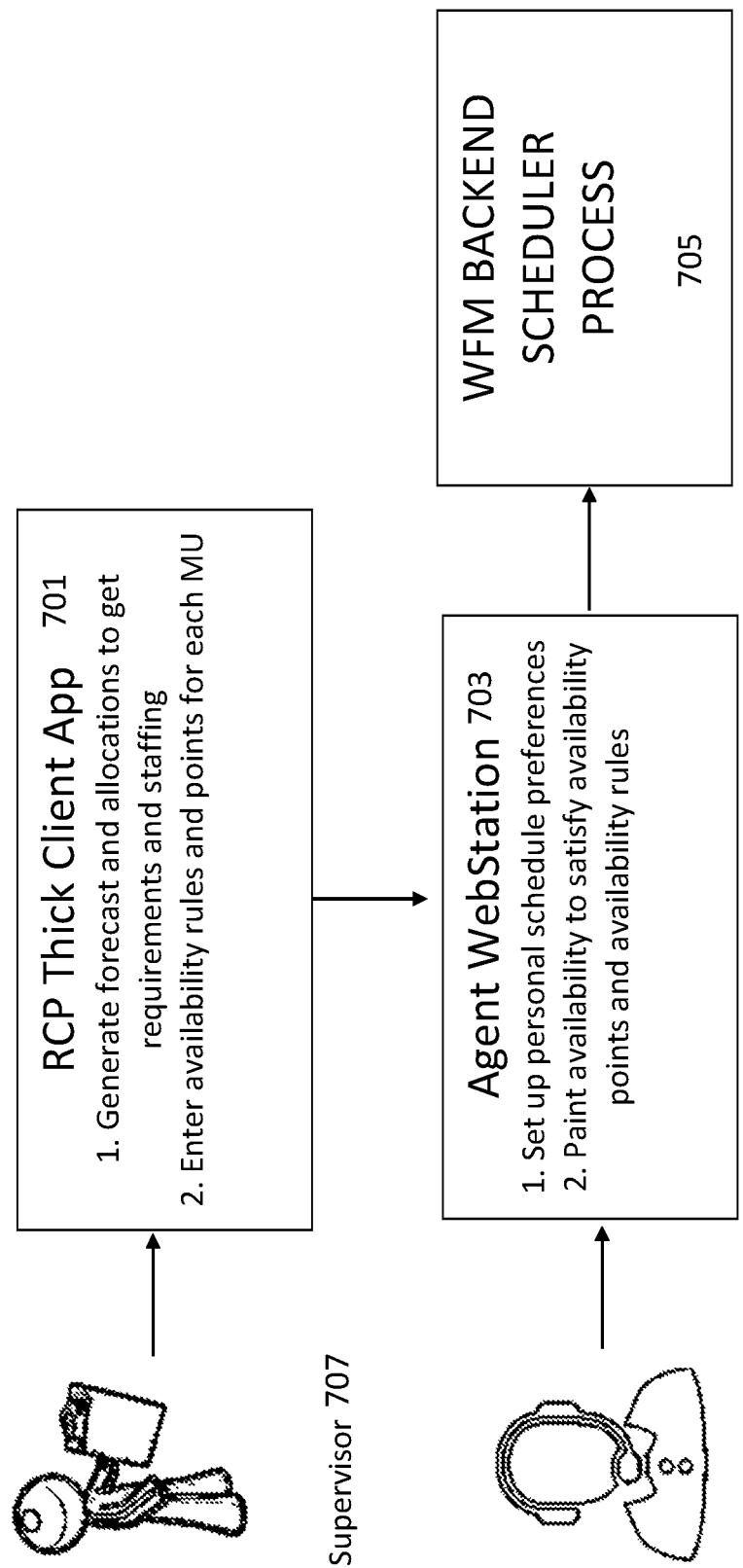
Figure 7C:
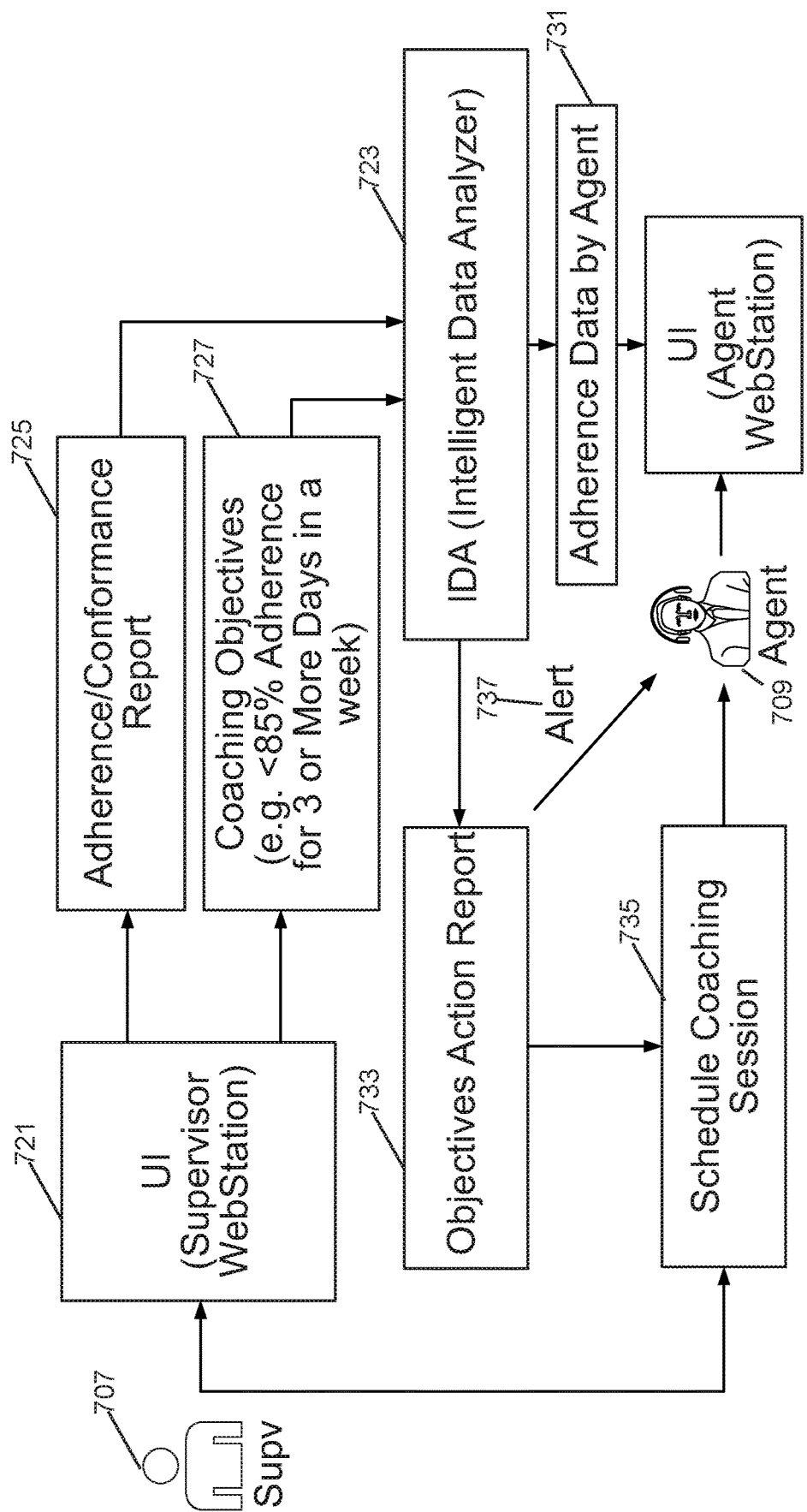

Reference is made to FIGS. 7A-C, which are exemplary data flows of information between different components in an intelligent adherence/conformance analysis coaching system, according to embodiments of the invention.

FIG. 7A depicts an exemplary data flow for automatically generating schedules or automatically modifying generated schedules, according to embodiments of the invention.

The intelligent adherence/conformance analysis coaching system may include a rich client platform ("RCP") thick client application 701, an agent webstation 703, and a workforce management ("WFM") backend scheduler process 705.

The RCP thick client application 701 may run or be executed on a client device, such as a supervisor device (e.g., the supervisor device 203 of FIG. 2). A supervisor 707 (e.g. a person) may utilize the RCP thick client app 701 to generate staffing forecasts and staffing allocations to get staffing requirements, such as how many of each type of agent (e.g., sales agent, customer service agent, etc.) are needed at the various times the call center is operated. The supervisor 707 may utilize the RCP thick client app 701 to enter availability rules and points for each management unit ("MU"). A MU may be a grouping in a work force management organization, such as a call center, and agents may be assigned to this grouping by a date range. For example, an MU may be a sales MU or a customer service MU. An agent may be assigned to only one MU per date range. For example, an agent may belong to a first MU from Jan. 1, 2019 to Jan. 31, 2019 and may belong to a second MU from Feb. 1, 2019 to Feb. 28, 2019. An agent may not belong to two different MUs on any given date The RCP thick client app 701 may be configured to transmit the staffing requirements and availability rules and points for each MU to the agent webstation 703.

The agent webstation 703 may be run or be executed on an agent device (e.g., the agent devices $201_1$-$201_n$ of FIG. 2). The agent 709 may utilize the agent webstation 703 to set up his or her personal schedule preferences, such as preferred hours and days for working at the call center. The agent's 709 options for setting up his or her personal schedule preferences may be constrained by the forecast and allocations received from RCP thick client app 701. For example, if enough agents or types of agents have already been scheduled for a certain dates/times, the agent 709 may not have an option to pick to work such dates/times and may only have the choice between a limited amount of date/time options.

The WFM backend scheduler process 705 may be run or be executed on the supervisor device. The WFM backend scheduler process 705 may be configured to generate schedules or modify generated schedules based on the supervisor's 707 forecast and allocations and the agent's 709 schedule preferences by utilizing the availability rules and points for each MU.

FIG. 7B depicts an exemplary data flow for communication between agents and 709 and callers 715.

The intelligent adherence/conformance analysis coaching system may include an automatic call distributor ("ACD") 717, a work force management ("WFM") process 719, and an WFM database 720 (e.g., a storage 130 of FIG. 1). The ACD 717 and WFM process 719 may be run or be executed on a server (e.g., the server 205 of FIG. 2) and/or supervisor device (e.g., the supervisor device 203 of FIG. 2) in the call center.

Callers 715 may contact the call center and the ACD 717 may put the callers in a queue or in more than one queue (e.g., a sales queue, a customer service queue) based on options selected by the callers 715 when contacting the call center. Based on the schedules generated by the WFM backend scheduler process 705, the WFM process 719 may connect the callers 715 on the queue to an agent 709. For example, if the caller has selected that they are calling for customer service, the ACD 717 may connect the caller 715 to the next available agent 709 which is scheduled to perform customer service. The callers' 715 call details may be stored as agent activity in the WFM database 720. For example, the start and stop times and/or the total amount of time that the call took may be saved as adherence and/or conformance data, respectively, for the agent 709 which took the caller's 715 call.

FIG. 7C depicts an exemplary data flow for scheduling coaching sessions, according to embodiments of the present invention.

The intelligent adherence/conformance analysis coaching system may include a supervisor web station 721 which may be run or be executed on the supervisor device (e.g., the supervisor device 203 of FIG. 2), and an intelligent data analyzer (IDA) 723 which may be run or be executed on the supervisor device or a call center server (e.g., the server 205 of FIG. 2).

The supervisor web station 721 may be configured to generate adherence/conformance report 725 based on the agent schedules generated by the RCP thick client application 701 and based on the agent activity (e.g., the start and stop times and/or the total amount of time that the calls took) stored in WFM database 720. The adherence and/or conformance report 725 may include the adherence data (e.g., the actual start and stop times that each agent actually was on calls and the scheduled start and stop times that the agent was scheduled to be on calls) and/or conformance data (e.g., the actual total amount of time each agent was actually on calls and the scheduled total amount of time the agent was scheduled to be on calls) for each agent 709 at the call center.

The supervisor web station 721 may be configured to display a graphical user interface (e.g., the graphical user interface of FIG. 3) for selecting a coaching objective 727 and a graphical user interface displaying a supervisor dashboard (e.g., the graphical user interface of FIG. 4). The supervisor web station 721 may be configured to transmit a selected coaching objective 727, such as a percentage of adherence (calculated utilizing EQN. 3) which is less than 85% for three or more days in one week, and the agent action reports to the intelligent data analyzer 723.

The IDA 723 may be configured to utilize the adherence/conformance report 725 and coaching objectives 727 to generate an objectives action report 733 (e.g., the agent action report of FIG. 5) for each agent 709. The IDA 723 may generate adherence data/conformance data 731 by agent 709 by separating out that agent's adherence/conformance data in the adherence/conformance report 725.

The IDA 723 may be configured to transmit the adherence data/conformance data 731 of an agent 709 to the agent 709. The IDA 723 may be configured to transmit the objectives action report 733 to the supervisor webstation 721. The objectives action report 733 may be utilized by the supervisor webstation 721 to identify agents 709 in need of coaching and to schedule coaching sessions 735 for the identified agents. The objectives action report 733 for each of the identified agents may be made available to each of the agents to give them insight into their adherence/conformance data. The supervisor 707 may use the objectives action report 733 to schedule a coaching session by using the net staffing data to ensure the coaching session does not affect staffing adversely.

The supervisor 707, utilizing the supervisor webstation 721, may set up automatic alerts to be sent to identified agents so that the agents 709 have a chance to rectify their adherence/conformance issue before the formal coaching, thereby empowering them. For example, the IDA 723 and/or supervisor webstation 721 may be configured to transmit an alert 737 along with the schedule for coaching to the identified agents. Each alert 737 may include a date of occurrence and include or be a link to more information indicating why the agent has been determined to require coaching.

Figure 8:
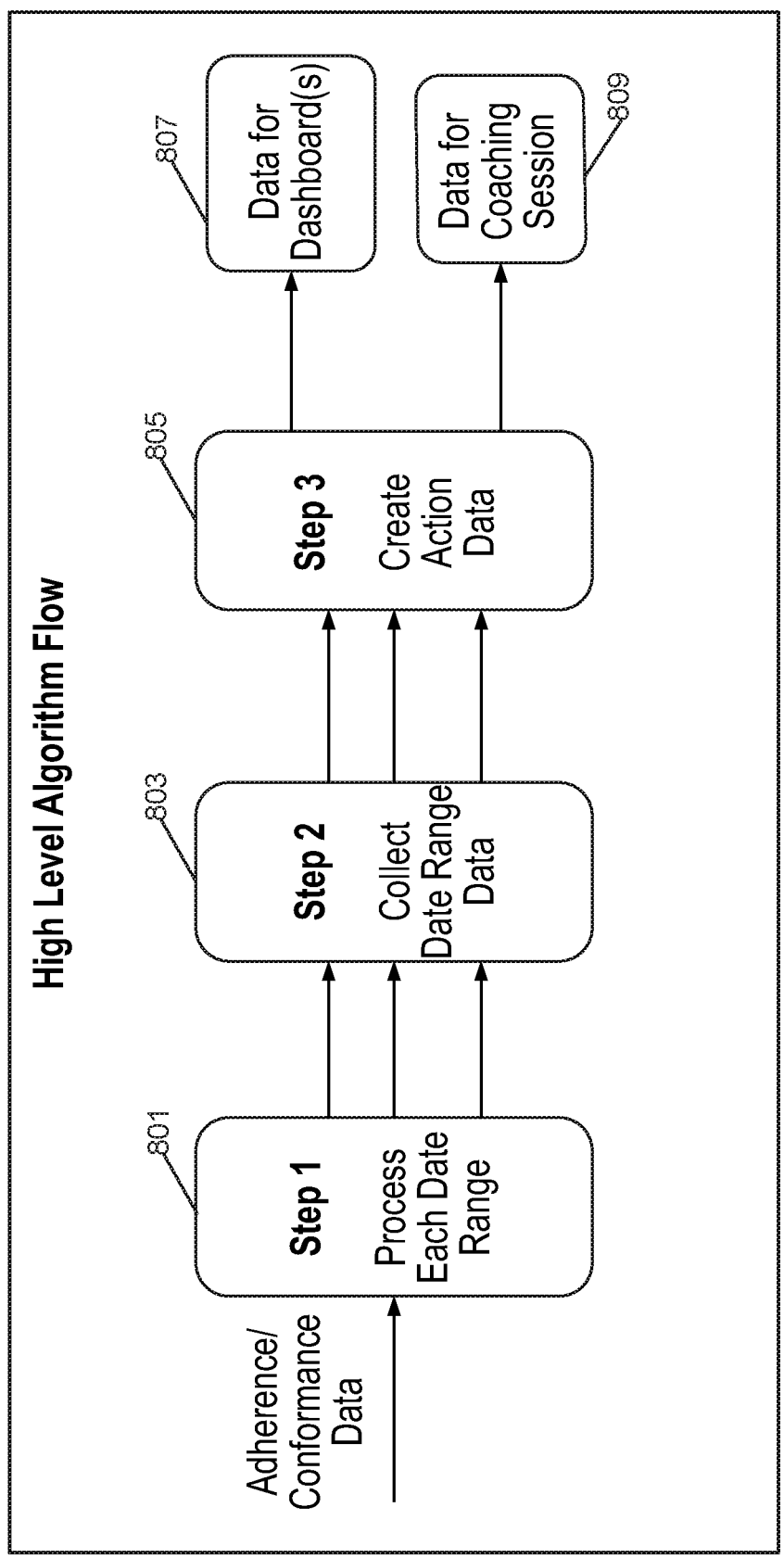
FIG. 8 is an exemplary high-level flowchart of a method for generating data for dashboard(s) and coaching sessions, according to embodiments of the invention.

Reference is made to FIG. 8, which is an exemplary high-level flowchart of a method for generating data for dashboard(s) and coaching sessions, according to embodiments of the invention.

In operation 801, a supervisor device (e.g., the supervisor device 203 of FIG. 2) may process received adherence/conformance data by a date range. For example, the supervisor may choose two months of data to be processed. The supervisor device may be configured to, for each week of adherence/conformance data, process the adherence/conformance data for each date in the week.

In operation 803, the supervisor device may collect the adherence/conformance data for each agent for each date range into date range action data. The date range action data may be, for the defined period of time, the number of occurrences agent is not meeting the objective. For example, if the defined period of time is for a week the date range action data may be the number of occurrences where the agent has not met the objective for that week In operation 805, the supervisor device may, after all date ranges are processed, generate agent action reports (e.g., the agent action report of FIG. 5) for each agent.

In operation 807, the supervisor device may utilize the agent action reports to generate data for dashboard(s) (e.g., the supervisor dashboard of FIG. 4 and/or the agent dashboard of FIG. 6). In operation 809, the supervisor device may utilize the agent action reports to generate data for coaching sessions, such as the date of scheduled coaching and start and end time of scheduled coaching.

Figure 9:
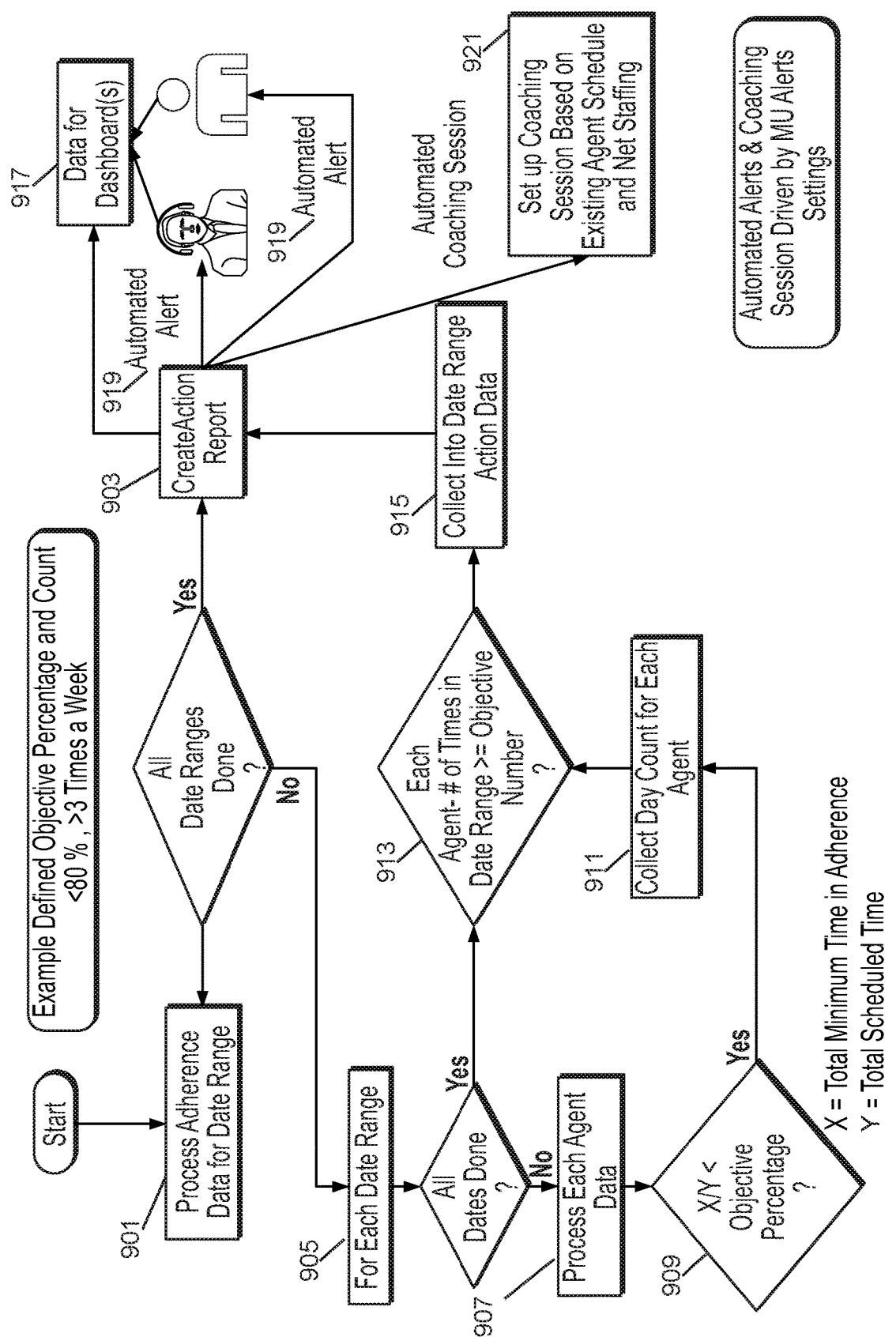
FIG. 9 is an exemplary detailed flowchart for an intelligent adherence/conformance analysis coaching method, according to embodiments of the present invention.

Reference is made to FIG. 9, which is an exemplary detailed flowchart for an intelligent adherence/conformance analysis coaching method, according to embodiments of the present invention.

In operation 901, a supervisor device (e.g., the supervisor device 203 of FIG. 2) may process received adherence/conformance data by a date range. For example, the supervisor may choose two months of data to be processed. The supervisor device may be configured to, for each week of adherence/conformance data, process the adherence/conformance data for each date in the week.

If all days have been processed, in operation 903, the supervisor device may generate agent action reports (e.g., the agent action report of FIG. 5) for each agent.

If all days have not been processed, in operation 905, the supervisor device may, for each date range, process each week of adherence/conformance data. In operation 907, the supervisor device may, for each agent, process the adherence/conformance data for each date in the date range. In operation 909, the supervisor device may determine if the agent has not met a coaching objective (e.g., whether the agent's adherence/conformance data has met the goal amount (e.g., the objective value selection 309) of adherence/conformance) on any of the days.

In operation 911, the supervisor device may collect agent's adherence/conformance data for the days where the agent has not met the coaching objective. For example, if the agent has not met a coaching objective where the total time in adherence/conformance (X) divided by the total scheduled time (Y) for a day is less than an objective percentage (e.g., the objective value selection 309), the supervisor device may collect the adherence/conformance data for that day.

Once all days have been processed, in operation 913, the supervisor device may automatically identify agents requiring coaching by determining, for each agent which has had his or her adherence/conformance data collected, if the agent has not met the coaching objective for more than a predetermined number of days (e.g., the occurrence value selection 311) in a period of a selected frequency (e.g., frequency selection 313). For example, an agent may be identified as requiring coaching if the adherence/conformance of the agent is less than 80% for more than 3 times in a week.

In operation 915, the supervisor device may collect data for each agent identified as requiring coaching into the date range action data.

After all the days have been processed, in operation 903, the supervisor device may generate agent action reports (e.g., the agent action report of FIG. 5) for each agent which has been identified as requiring coaching.

In operation 917, the supervisor device may utilize the agent action reports to generate data for dashboard(s) (e.g., the supervisor dashboard of FIG. 4 and/or the agent dashboard of FIG. 6). In operation 919, the supervisor device may transmit an automated alert to each agent identified as requiring coaching, and may transmit an automated alert to the supervisor. In operation 921, the supervisor device may automatically schedule coaching sessions for each of the agents identified as requiring coaching based on an existing agent schedule and net staffing. The automated alerts and schedule of coaching session may be based on MU alerts settings, such as whether to automatically send alters to agents identified as needing coaching.

Figure 10:
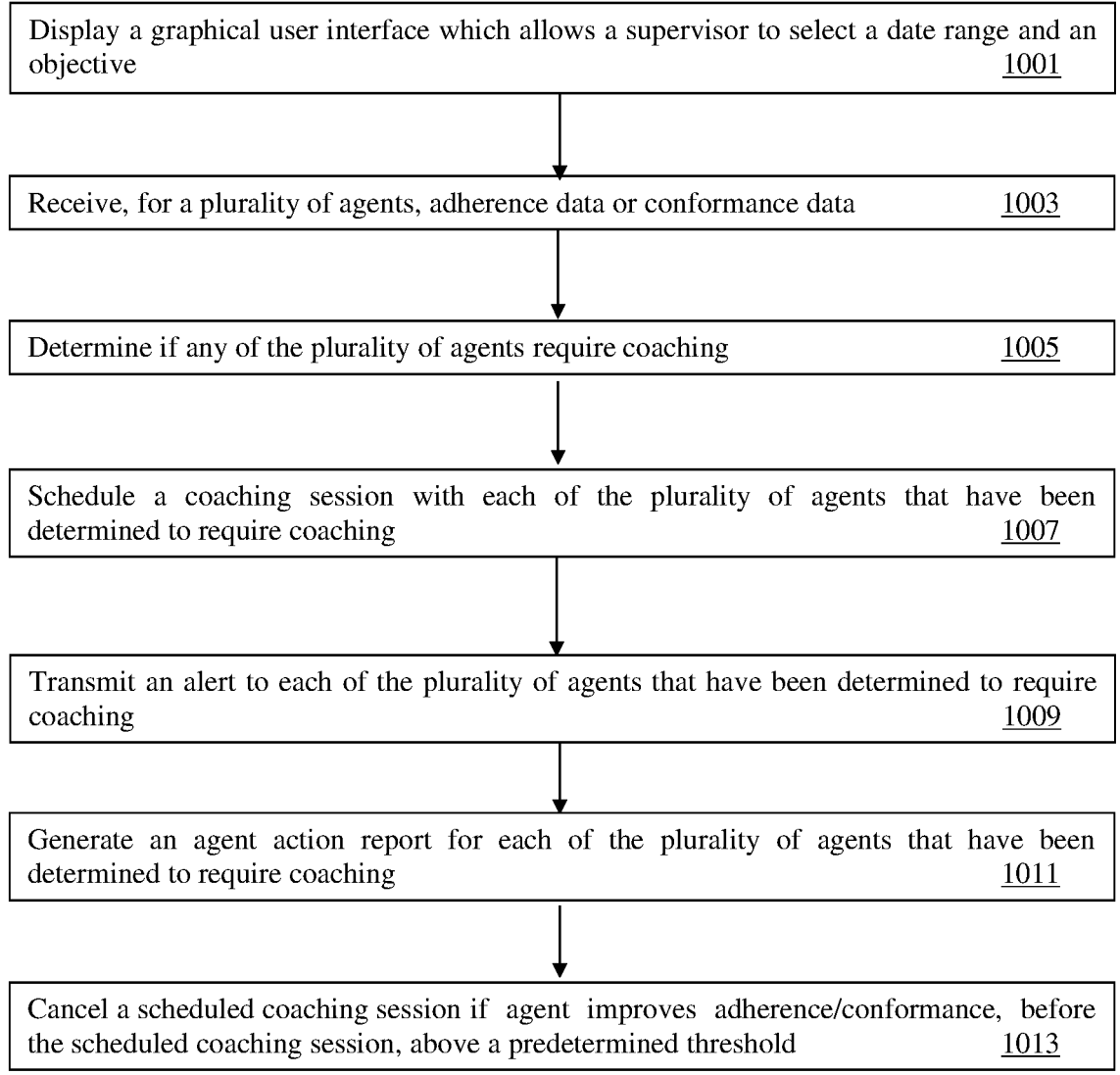
FIG. 10 is an exemplary high-level flowchart for an intelligent adherence/conformance analysis coaching method, according to embodiments of the present invention.

Reference is made to FIG. 10, which is an exemplary high-level flowchart for an intelligent adherence/conformance analysis coaching method, according to embodiments of the present invention.

In operation 1001, a supervisor device (e.g., the supervisor device 203 of FIG. 2) may display a graphical user interface which allows a supervisor to select a date range and an objective. The objective may be a goal amount of occurrences of a goal amount of adherence or a goal amount of conformance to occur at a goal frequency. For example, the objective may be adherence/conformance greater than 80% for more than three times in one week.

In operation 1003, the supervisor device may receive, for one or more of agents, adherence data or conformance data. The adherence data may include, for each of one or more scheduled activities during the date range, an amount of time in adherence or an amount of time not in adherence based on a comparison of scheduled start and stop times for the scheduled activity and actual start and stop times that the scheduled activity was actually performed by the agent. In some embodiments of the invention, the adherence data may include for each of one or more of dates in the date range, for each of the one or more of agents, a percentage of adherence for the agent based on a comparison of a sum of the amount of time the agent was in adherence or a sum of the amount of time the agent was not in adherence for each of the scheduled activities on that date, and a sum of the scheduled total amount of time for each of the scheduled activities on that date.

The conformance data may include, for each of one or more scheduled activities during the date range, an amount of time in conformance or an amount of time not in conformance based on a comparison of a scheduled total amount of time for the scheduled activity and an actual total amount of time the scheduled activity was actually performed by the agent. In some embodiments of the invention, the conformance data may include for each of one or more of dates in the date range, for each of the one or more of agents, a percentage of conformance for the agent based on a comparison of a sum of the actual total amount of time each of the scheduled activities were actually performed by the agent and a sum of the scheduled total amount of time for each of the scheduled activities on that date.

In operation 1005, the supervisor device may determine if any of the one or more of agents require coaching based on a comparison of the adherence data at the goal frequency to the goal amount of occurrences of the goal amount of adherence at the goal frequency, or a comparison of the conformance data at the goal frequency to the goal amount of occurrences of the goal amount of conformance at the goal frequency. In some embodiments of the invention, the supervisor device may determine if any of the one or more of agents require coaching by, for each of the one or more agents, determining an amount of nonadherence days in the date range that the percentage of adherence is less than or equal to the goal amount of adherence, or by determining an amount of nonconformance days in the date range that the percentage of conformance is less than or equal to the goal amount of conformance, and either: determining if the amount of nonadherence days at the goal frequency is greater than or equal to the goal amount of occurrences of the goal amount of adherence at the goal frequency, or determining if the amount of nonconformance days at the goal frequency is greater than or equal to the goal amount of occurrences of the goal amount of conformance at the goal frequency.

In operation 1007, the supervisor device may schedule a coaching session with each of the one or more agents that have been determined to require coaching.

In operation 1009, the supervisor device may transmit an alert to each of the one or more agents that have been determined to require coaching. The alert may include information indicating why the agent has been determined to require coaching, or the alert may be or may include a link to the information indicating why the agent has been determined to require coaching.

In operation 1011, the supervisor device may, for each of the one or more of agents that have been scheduled for a coaching session, generate an agent action report (e.g., the agent action report of FIG. 5). In some embodiments of the invention, the supervisor device may be configured to allow the supervisor to select, through the graphical user interface, for each of the one or more agents that have been determined to require coaching, whether to transmit the agent action report along with the alert to that agent.

In operation 1013, the supervisor device may, for each of the one or more of agents that have been scheduled for a coaching session, cancel the coaching session if an amount of days the agent was not in adherence/conformance, during a predetermined subsequent period of time, is less than a first predetermined threshold. In some embodiments of the invention, the supervisor device may, for each of the one or more of agents that have been scheduled for a coaching session, cancel the coaching session if a difference between the amount of days the agent was not in adherence/conformance, during the predetermined subsequent period of time at the goal frequency, and the amount of days not in adherence/conformance, during the date range at the goal frequency, is less than a second predetermined threshold.

It will thus be seen that the objects set forth elsewhere herein, among those made apparent from the preceding description, are efficiently attained and, because certain changes may be made in carrying out the method described elsewhere herein and in the construction(s) set forth without departing from the spirit and scope of the invention, it is intended that all matter contained in the above description and shown in the accompanying drawings shall be interpreted as illustrative and not in a limiting sense.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

It is also to be understood that the following claims are intended to cover all of the generic and specific features of the invention herein described and all statements of the scope of the invention which, as a matter of language, might be said to fall therebetween.

The invention claimed is:

1. An intelligent adherence analysis coaching system comprising:
   a monitor; and
   one or more processors configured to:
      display a graphical user interface on the monitor which allows a supervisor to select a date range and an objective, wherein the objective is a goal amount of occurrences of a goal amount of adherence to occur at a goal frequency;
      receive, for one or more agents, adherence data wherein the adherence data comprises, for each of one or more scheduled activities during the date range, an amount of time in adherence or an amount of time not in adherence based on a comparison of scheduled start and stop times for the scheduled activity and actual start and stop times that the scheduled activity was actually performed by the agent; and
      determine if any of the one or more agents require coaching based on a comparison of the adherence data at the goal frequency to the goal amount of occurrences of the goal amount of adherence at the goal frequency, or
      schedule a coaching session with each of the one or more agents that have been determined to require coaching; and
      transmit an alert to each of the one or more agents that have been determined to require coaching, wherein the alert comprises information indicating why the agent has been determined to require coaching.

2. The system of claim 1, wherein the adherence data comprises, for each of one or more dates in the date range, for each of the one or more agents, a percentage of adherence for the agent based on a comparison of:
   a sum of the amount of time the agent was in adherence or a sum of the amount of time the agent was not in adherence for each of the scheduled activities on that date, and
   a sum of the scheduled total amount of time for each of the scheduled activities on that date.

3. The system of claim 2, wherein the one or more processors are configured to determine if any of the one or more agents require coaching by, for each of the one or more agents:
   determining an amount of nonadherence days in the date range that the percentage of adherence is less than or equal to the goal amount of adherence, and
   determining if the amount of nonadherence days at the goal frequency is greater than or equal to the goal amount of occurrences of the goal amount of adherence at the goal frequency.

4. The system of claim 3, wherein the one or more processor is configured to, for each of the one or more agents that have been scheduled for a coaching session, cancel the coaching session if:
   an amount of nonadherence days during a predetermined subsequent period of time is less than a first predetermined threshold; or
   a difference between the amount of nonadherence days during the predetermined subsequent period of time at the goal frequency and the amount of nonadherence days during the date range at the goal frequency is less than a second predetermined threshold;
   wherein the predetermined subsequent period of time is between after the date range ends and a time that the agent was scheduled for the coaching session.

5. The system of claim 2, wherein:
the one or more processors is configured to generate a report for each of the one or more agents that have been determined to require coaching, and
the report comprises the adherence data for the agent that has been determined to require coaching and an indication of what days were nonadherence days.

6. The system of claim 2, wherein the one or more processors is configured to allow the supervisor to select, through the graphical user interface, for each of the one or more agents that have been determined to require coaching, whether the one or more processors transmit the report along with the alert to that agent.

7. The system of claim 1, wherein one or more processors is configured so that the graphical user interface displays, for each of the of the one or more agents that have been determined to require coaching:
a result of the comparison of the objective and the adherence data,
a link, which when clicked, causes the one or more processors to display the report in the graphical user interface,
a schedule of the agent's coaching session, and
a link, which when clicked, allows the supervisor to reschedule or cancel the agent's coaching session.

8. The system of claim 1, wherein for each of the one or more agents that have been determined to require coaching, the one or more processors is further configured to determine at least one proposed date and time for the coaching based on the agent's work schedule and net staffing during the at least one proposed date and time.

9. The system of claim 1, wherein the conformance data further comprises, for each of one or more dates in the date range, for each of the one or more agents, a percentage of conformance for the agent based on a comparison of a sum of the actual total amount of time each of the scheduled activities were actually performed by the agent and a sum of the scheduled total amount of time for each of the scheduled activities on that date.

10. An intelligent conformance analysis coaching system comprising:
a monitor; and
one or more processors configured to:
display a graphical user interface on the monitor which allows a supervisor to select a date range and an objective, wherein the objective is a goal amount of occurrences of a goal amount conformance to occur at a goal frequency;
receive, for one or more agents, conformance data, wherein the conformance data comprises, for each of one or more scheduled activities during the date range, an amount of time in conformance or an amount of time not in conformance based on a comparison of a scheduled total amount of time for the scheduled activity and an actual total amount of time the scheduled activity was actually performed by the agent;
determine if any of the one or more agents require coaching based on a comparison of the conformance data at the goal frequency to the goal amount of occurrences of the goal amount of conformance at the goal frequency;
schedule a coaching session with each of the one or more agents that have been determined to require coaching; and
transmit an alert to each of the one or more agents that have been determined to require coaching, wherein the alert comprises information indicating why the agent has been determined to require coaching.

11. An intelligent adherence analysis coaching method comprising:
displaying a graphical user interface which allows a supervisor to select a date range and an objective, wherein the objective is a goal amount of occurrences of a goal amount of adherence to occur at a goal frequency;
receiving, for one or more agents, adherence data or conformance data, wherein the adherence data comprises, for each of one or more scheduled activities during the date range, an amount of time in adherence or an amount of time not in adherence based on a comparison of scheduled start and stop times for the scheduled activity and actual start and stop times that the scheduled activity was actually performed by the agent; and
determining if any of the one or more agents require coaching based on a comparison of the adherence data at the goal frequency to the goal amount of occurrences of the goal amount of adherence at the goal frequency, or
scheduling a coaching session with each of the one or more agents that have been determined to require coaching; and
transmitting an alert to each of the one or more agents that have been determined to require coaching, wherein the alert comprises information indicating why the agent has been determined to require coaching.

12. The method of claim 11, wherein the adherence data comprises, for each of one or more dates in the date range, for each of the one or more agents, a percentage of adherence for the agent based on a comparison of:
a sum of the amount of time the agent was in adherence or a sum of the amount of time the agent was not in adherence for each of the scheduled activities on that date, and
a sum of the scheduled total amount of time for each of the scheduled activities on that date.

13. The method of claim 12, comprising:
determining if any of the one or more agents require coaching by, for each of the one or more agents:
determining an amount of nonadherence days in the date range that the percentage of adherence is less than or equal to the goal amount of adherence, or determining an amount of nonconformance days in the date range that the percentage of conformance is less than or equal to the goal amount of conformance, and either:
determining if the amount of nonadherence days at the goal frequency is greater than or equal to the goal amount of occurrences of the goal amount of adherence at the goal frequency, or
determining if the amount of nonconformance days at the goal frequency is greater than or equal to the goal amount of occurrences of the goal amount of conformance at the goal frequency.

14. The method of claim 13, comprising, for each of the one or more agents that have been scheduled for a coaching session, canceling the coaching session if:
an amount of nonadherence days during a predetermined subsequent period of time is less than a first predetermined threshold, or an amount of nonconformance days during the predetermined subsequent period of time is less than a second predetermined threshold; or
a difference between the amount of nonadherence days during the predetermined subsequent period of time at the goal frequency and the amount of nonadherence days during the date range at the goal frequency is less than a third predetermined threshold, or a difference between the amount of nonconformance days during the predetermined subsequent period of time at the goal frequency and the amount of nonconformance days during the date range at the goal frequency is less than a fourth predetermined threshold;

wherein the predetermined subsequent period of time is between after the date range ends and a time that the agent was scheduled for the coaching session.

15. The method of claim 12, comprising generating a report for each of the one or more agents that have been determined to require coaching, wherein the report comprises:

the adherence data for the agent that has been determined to require coaching and an indication of what days were nonadherence days; or the conformance data for the agent that has been determined to require coaching and an indication of what days were nonconformance days.

16. The method of claim 12, comprising to allowing the supervisor to select, through the graphical user interface, for each of the one or more agents that have been determined to require coaching, whether to transmit the report along with the alert to that agent.

17. The method of claim 11, comprising displaying, through the graphical user interface, for each of the of the one or more agents that have been determined to require coaching:

a result of the comparison of the objective and the adherence data or the conformance data, a link, which when clicked, displays the report in the graphical user interface, a schedule of the agent's coaching session, and a link, which when clicked, allows the supervisor to reschedule or cancel the agent's coaching session.

18. The method of claim 11, comprising, for each of the one or more agents that have been determined to require coaching, determining at least one proposed date and time for the coaching based on the agent's work schedule and net staffing during the at least one proposed date and time.

19. An intelligent conformance analysis coaching method comprising:

displaying a graphical user interface which allows a supervisor to select a date range and an objective, wherein the objective is a goal amount of occurrences of a goal amount of adherence or a goal amount of conformance to occur at a goal frequency;

receiving, for one or more agents, conformance data, wherein the conformance data comprises, for each of the one or more scheduled activities during the date range, an amount of time in conformance or an amount of time not in conformance based on a comparison of a scheduled total amount of time for the scheduled activity and an actual total amount of time the scheduled activity was actually performed by the agent;

determining if any of the one or more agents require coaching based on a comparison of the conformance data at the goal frequency to the goal amount of occurrences of the goal amount of conformance at the goal frequency;

scheduling a coaching session with each of the one or more agents that have been determined to require coaching; and transmitting an alert to each of the one or more agents that have been determined to require coaching, wherein the alert comprises information indicating why the agent has been determined to require coaching.

20. The method of claim 19, wherein the conformance data further comprises, for each of one or more dates in the date range, for each of the one or more agents, a percentage of conformance for the agent based on a comparison of a sum of the actual total amount of time each of the scheduled activities were actually performed by the agent and a sum of the scheduled total amount of time for each of the scheduled activities on that date.

\* \* \* \* \*